United States Patent
Rosenbaum

(10) Patent No.: US 12,258,049 B2
(45) Date of Patent: Mar. 25, 2025

(54) METHOD AND SYSTEM FOR ANALYZING THE CONTROL OF A VEHICLE

(71) Applicant: Walter Steven Rosenbaum, Jerusalem (IL)

(72) Inventor: Walter Steven Rosenbaum, Jerusalem (IL)

(*) Notice: Subject to any disclaimer, the term of this patent is extended or adjusted under 35 U.S.C. 154(b) by 0 days.

(21) Appl. No.: 17/979,876

(22) Filed: Nov. 3, 2022

(65) Prior Publication Data

US 2023/0060300 A1     Mar. 2, 2023

Related U.S. Application Data

(63) Continuation-in-part of application No. 16/856,449, filed on Apr. 23, 2020, now Pat. No. 11,524,707.

(30) Foreign Application Priority Data

Apr. 24, 2019   (EP) ..................... 19170808

(51) Int. Cl.
*B60W 60/00* (2020.01)
*B60W 50/06* (2006.01)
(Continued)

(52) U.S. Cl.
CPC ........ *B60W 60/0057* (2020.02); *B60W 50/06* (2013.01); *B60W 50/14* (2013.01);
(Continued)

(58) Field of Classification Search
CPC .. B60W 60/0057; B60W 50/06; B60W 50/14; B60W 60/0053; B60W 60/0059;
(Continued)

(56) References Cited

U.S. PATENT DOCUMENTS

| | | | |
|---|---|---|---|
| 6,438,472 B1 | 8/2002 | Tano | G01C 21/26 701/29.6 |
| 10,077,056 B1 | 9/2018 | Fields | B60W 50/0098 |

(Continued)

FOREIGN PATENT DOCUMENTS

| | | |
|---|---|---|
| EP | 3378722 A1 | 9/2018 |
| FR | 3041917 A1 | 4/2017 |

OTHER PUBLICATIONS

Vogelpohl Tobias et al, "Transitioning to manual driving requires additional time after automation deactivation", Transportation Research Part F: Traffic Psychology and Behaviour, Pergamon, Amsterdam, NL, (Apr. 17, 2018), vol. 55, doi:10.1016/J.TRF.2018.03.019, ISSN 1369-8478, pp. 464-482, XP085389156.

(Continued)

*Primary Examiner* — James J Lee
*Assistant Examiner* — Alexander George Matta
(74) *Attorney, Agent, or Firm* — Laurence A. Greenberg; Werner H. Stemer; Ralph E. Locher

(57) ABSTRACT

A method and a system analyze the control of a vehicle having an autonomous driving unit. A change in the driving mode from autonomous driving to manual driving is detected, and at least one driving parameter before and/or after detecting the change is monitored. Based on driving values obtained by the monitoring with respect to the detected change in driving mode, at least one driving quantity quantifying the quality of interplay between the autonomous driving unit and a human driver is determined.

16 Claims, 3 Drawing Sheets

(51) Int. Cl.
*B60W 50/14* (2020.01)
*G09B 19/16* (2006.01)

(52) U.S. Cl.
CPC .... *B60W 60/0053* (2020.02); *B60W 60/0059* (2020.02); *G09B 19/167* (2013.01); *B60W 2520/10* (2013.01); *B60W 2520/105* (2013.01)

(58) Field of Classification Search
CPC ....... B60W 2520/10; B60W 2520/105; B60W 40/09; B60W 2540/18; B60W 2540/10; B60W 2540/12; B60W 2556/10; B60W 2756/10; G09B 19/167
See application file for complete search history.

(56) References Cited

U.S. PATENT DOCUMENTS

| | | | | |
|---|---|---|---|---|
| 10,872,379 | B1 | 12/2020 | Nepomuceno | G08G 1/0141 |
| 2013/0110310 | A1* | 5/2013 | Young | G01C 21/3697 |
| | | | | 701/1 |
| 2015/0094899 | A1* | 4/2015 | Hackenberg | B60W 60/0059 |
| | | | | 701/23 |
| 2016/0042650 | A1 | 2/2016 | Stenneth | G09B 5/00 |
| | | | | 701/23 |
| 2016/0378114 | A1 | 12/2016 | Laur et al. | |
| 2017/0038773 | A1 | 2/2017 | Gordon | G08G 1/096775 |
| 2017/0234689 | A1* | 8/2017 | Gibson | B60W 60/0015 |
| | | | | 701/25 |
| 2017/0309092 | A1 | 10/2017 | Rosenbaum | G01M 17/007 |
| 2017/0372431 | A1 | 12/2017 | Perl et al. | |
| 2018/0029610 | A1* | 2/2018 | McNew | B60W 50/0097 |
| 2018/0039268 | A1* | 2/2018 | Mangal | B60W 30/12 |
| 2018/0075538 | A1 | 3/2018 | Konrardy | B60Q 9/00 |
| 2018/0173227 | A1 | 6/2018 | Mukai et al. | |
| 2018/0329414 | A1 | 11/2018 | Igarashi et al. | |
| 2018/0335785 | A1* | 11/2018 | Miller | G08G 1/017 |
| 2019/0202477 | A1* | 7/2019 | Kapuria | G06V 20/597 |
| 2019/0278271 | A1* | 9/2019 | Blumer | B60W 60/0051 |
| 2019/0351914 | A1* | 11/2019 | Yu | G07C 5/0841 |
| 2020/0017124 | A1* | 1/2020 | Camhi | B60W 50/14 |
| 2020/0050209 | A1* | 2/2020 | Bai | B60K 31/0058 |
| 2020/0175787 | A1* | 6/2020 | Gortsas | G07C 5/10 |

OTHER PUBLICATIONS

Wandtner Bernhard et al, "Secondary task engagement and disengagement in the context of highly automated driving", Transportation Research Part F: Traffic Psychology and Behaviour, Pergamon, Amsterdam, NL, (Jun. 26, 2018), vol. 58, doi:10.1016/J.TRF.2018.06.001, ISSN 1369-8478. pp. 253-263, XP085467961.

Brandenburg S et al, "Switching from manual to automated driving and reverse: Are drivers behaving more risky after highly automated driving?", 17th International IEEE Conference on Intelligent Transportation Systems (ITSC), IEEE, (Oct. 8, 2014), doi:10.1109/ITSC.2014.6958168, pp. 2978-2983, XP032685683.

* cited by examiner

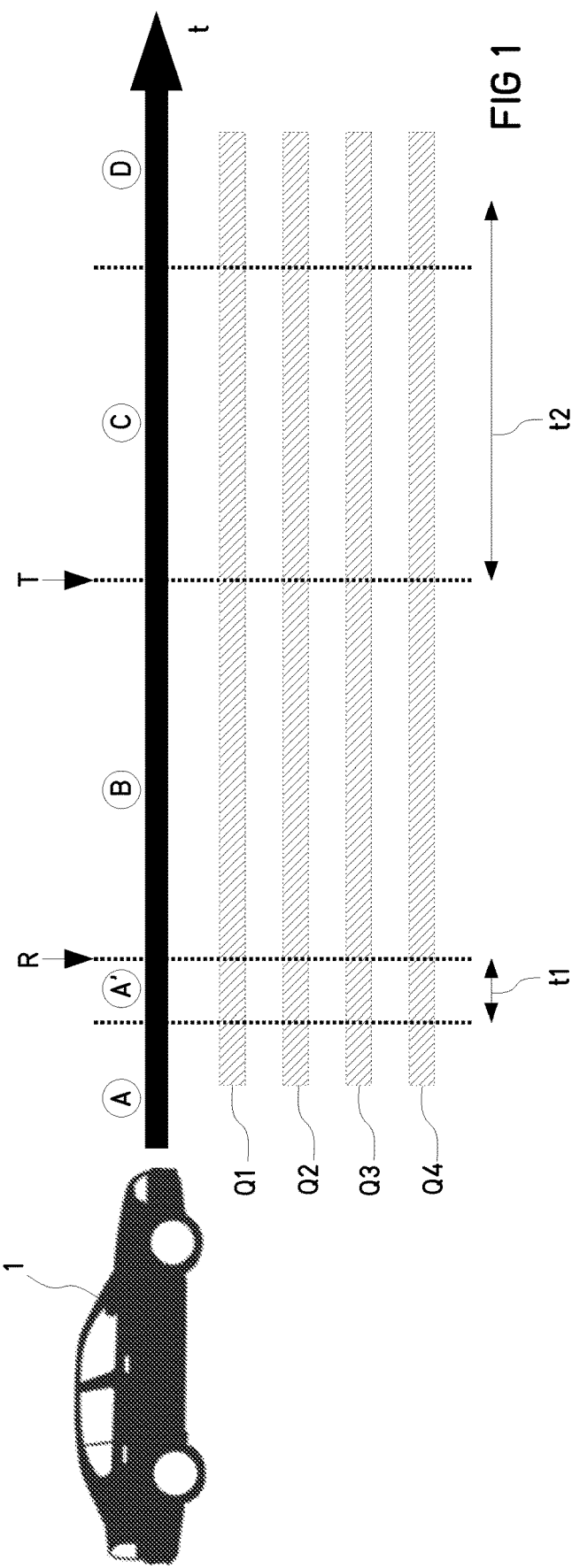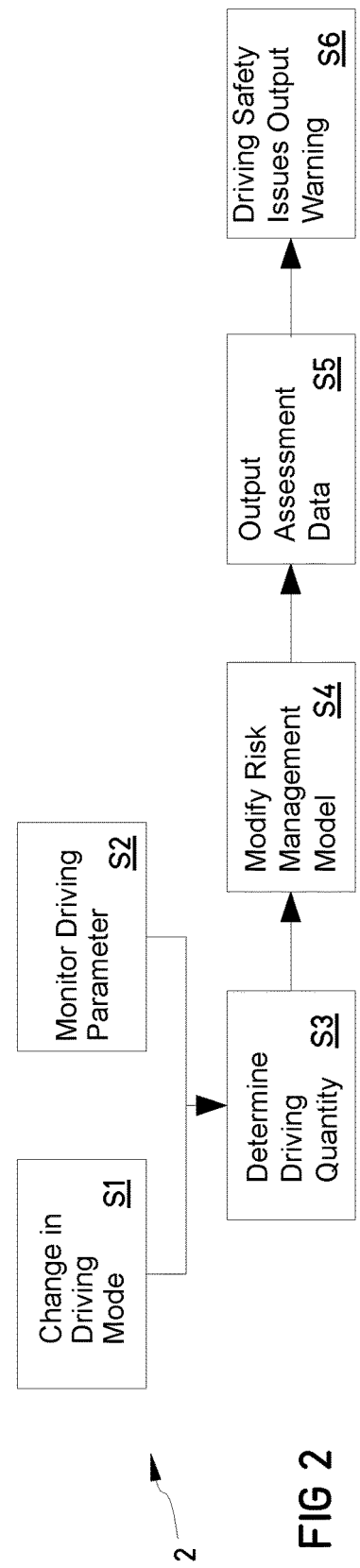

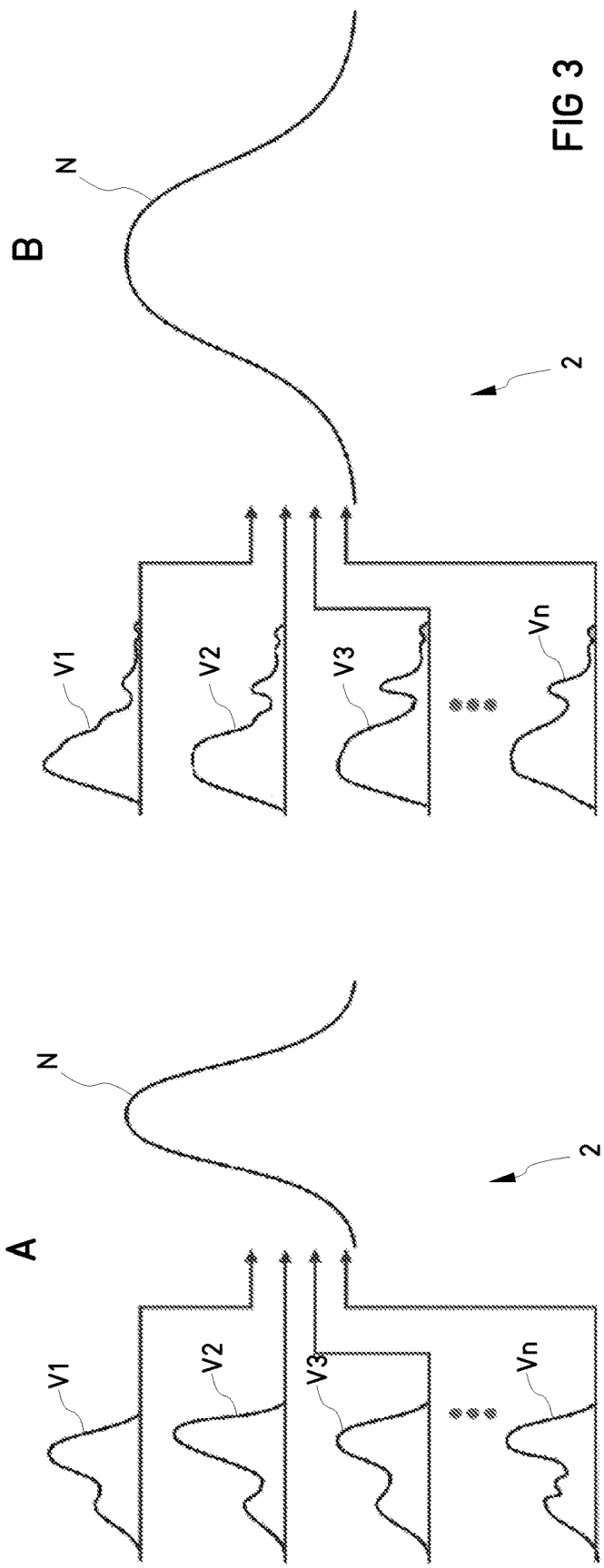
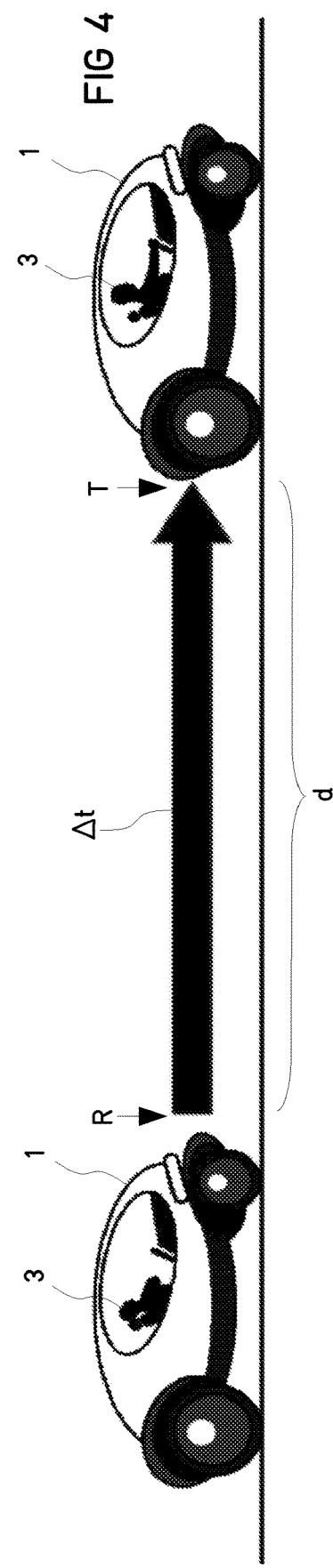

METHOD AND SYSTEM FOR ANALYZING THE CONTROL OF A VEHICLE

CROSS-REFERENCE TO RELATED APPLICATION

This is a Continuation-In-Part of U.S. application Ser. No. 16/856,449, filed Apr. 23, 2020, this application also claims the priority, under 35 U.S.C. § 119, of European Patent Application EP 19170808.0, filed Apr. 24, 2019; the prior applications are herewith incorporated by reference in their entirety.

FIELD AND BACKGROUND OF THE INVENTION

The present invention relates to a method and a system for analyzing the control of a vehicle comprising an autonomous driving unit.

Autonomous driving on public roads has progressed into a real part of the future automotive landscape. Reflective of its still ongoing evolution, autonomous driving systems are currently grouped into at least five incremental levels of capability, from level 1 where the human driver must be ready to take over any time, to level 5 corresponding to complete automated driving, while humans are just along for the ride and to tell the vehicle where to go.

Autonomous driving requires extremely capable software not only for driving the car but for recognizing the surrounding objects and for correct prediction of their potential behavior with regard to the current traffic scenario, i.e. the current driving situation of the autonomously driven car. Such recognition and prediction is extremely complex given the number and different kinds of objects, situations and possibilities of behavior. Any combination of objects, situations and possibilities of behavior which is not correctly interpreted by the software may lead to an accident, resulting in damage to persons, costs and loss of confidence in the car and its driving abilities. This not only places a huge burden on quality management, but also implies questions regarding liability issues. For example, it will be necessary to think about how vehicles capable of driving autonomously are insured, e.g. whether the driver or the software will be held responsible, or whether the liability will be shared among driver and software.

Thus, in order to provide the necessary safety, the software and its reaction to certain traffic situations is usually extensively tested. Such testing is generally done in millions of kilometers of test driving in completely or at least partly autonomous driving modes. Further, autonomous driving software may be programmed such that it recognizes a potentially overtaxing situation in advance and alerts the driver to take over control of the vehicle. This functionality is usually realized in autonomous driving systems of levels 1 to 3.

SUMMARY OF THE INVENTION

It is an object of the present invention to provide an improved method and system for assessing the capability of an autonomous driving unit.

This object is solved by a method and a system for improving a processor assessing a control of a vehicle comprising an autonomous driving unit according the independent claims.

With the foregoing and other objects in view there is provided, in accordance with the invention, a method for improving an operation of a vehicle having an autonomous driving unit configured for autonomously controlling the vehicle and a control takeover management unit configured for passing over control to a human driver. The method includes detecting, via a detector disposed in the vehicle, a change in a driving mode from autonomous driving to manual driving. The detecting step including at least one of: determining a point in time a control takeover request is outputted by the control takeover management unit, determining a point in time the human driver takes over control from the autonomous driving unit, and determining a point in time when the human driver assumes safe control over the vehicle. By a sensor disposed in the vehicle, at least one driving parameter during the autonomous driving unit and/or the human driver controlling the vehicle is monitored. At least one driving quantity quantifying a quality of interplay between the autonomous driving unit and the human driver is determined, by an evaluation unit, based on driving values provided by the sensor upon monitoring the at least one driving parameter during a time interval ending at, starting from or including a point in time determined by the detector. By a configuring unit disposed in a computation facility and based on the at least one determined driving quantity, a risk management model for assessing an effectiveness and/or safety of control takeover events in the vehicle having the autonomous driving unit and the control takeover management unit is configured. By a computer system disposed in the computation facility and having the risk management model, assessment data obtained by executing a configured risk management model is output. The vehicle is operated based on the assessment data.

The method for improving a processor assessing a control of a vehicle containing an autonomous driving unit according to a first aspect of the invention includes the steps of: (i) by a detection unit, detecting a change in the driving mode from autonomous driving to manual driving; (ii) by a sensor unit, monitoring at least one driving parameter before and/or after detecting the change; and (iii) by an evaluation unit, based on driving values obtained by the monitoring with respect to the detected change in driving mode, determining at least one driving quantity quantifying the quality of interplay between the autonomous driving unit and a human driver. Further, (iv) by a computer, based on the determined at least one driving quantity, at least one of the following is performed:

i) An insurance database containing actuarial data for the autonomous vehicle with its human driver, or a fleet of autonomous vehicles with their respective human drivers is generated or manipulated, e.g. updated. For example, the at least one driving quantity may be added to the database, or an existing driving quantity may be adjusted. This means in particular that a physical storage device such as a solid-state memory may be manipulated, e.g. magnetic properties thereof may be altered.
  ii) A risk management model for assessing the effectiveness and/or safety of a vehicle control takeover event is updated or generated. Particularly, a risk management model for assessing the effectiveness and/or safety of an autonomous vehicle with respect to control takeover events is updated or generated. Accordingly, the updated or generated model can be used to assess sequential and/or co-occurring autonomous and manual control. For example, the model or its update can be based on a comparison of driving values recorded during atypical autonomous driving situations occurring immediately prior to or during the period between a takeover request and the actual takeover by the human driver relative to driving values recorded during typical autonomous driving situations. By this means, the accordingly updated or generated risk management model can reflect or incorporate aspects of sequential and/or co-occurring control. Such atypical situations could be characterized, for instance, by degradation of autonomous control before a takeover of control by a human driver, and could arise due to unforeseeable sudden traffic events such as accidents in the vicinity of the autonomous vehicle, bad weather conditions, vehicle malfunctions and/or the like.

The updated or generated risk management model allows to quantify the autonomous driving software, e.g. AI, and/or the human driver, respectively, in their relative and/or individual effectiveness for design and/or operational use assessment. This means, in particular, that software such as an algorithm for associating the effectiveness and/or safety of the respective operator vehicle control, transfer of control man-machine interface and/or AI control can be adapted. Particularly, this algorithm can statistically quantify and asses the handling of transfer of control events by a particular autonomous driving unit/human driver combination relative to e.g. an average performance of vehicles in a vehicle fleet, for instance. By means of this adapted algorithm, autonomous driving and/or manual driving may be quantified individually and/or in concert for assessing the safety of operation and related design and statistical forecasting purposes related to the transfer of control.

For example, parameters of an established risk management model may be adapted. For example, the determined driving quantity can be associated with an accident occurrence probability of the risk management model during transfer of control. In other words, a likelihood of accident occurrence factor of the risk management model can be determined more precisely, and unbiasedly (in a statistical sense). Hence, the determined driving quantity may be associated with or utilized as a probabilistic parameter of the risk management model, and/or for initializing further parameters in the risk management model. The risk management model may thus be reflective of similarly measured and quantified operational reality that are then associated by statistical means to deterministically associate in an unbiased manner a customized or event occurrence for an autonomous vehicle and its human driver. In this way, a conventional actuarial algorithm, for example, may be extended such as being able to associate with the determined driving quantity for the respective transfer of control a "trend over time" (such as operator age, injury, cognitive decline, health, AI-control duration, etc.) that will allow association of an accident rate with the respective transfer of control that is more meaningful than a simple average.

Alternatively or additionally, an established risk management model is adapted to better mirror the traits of transfer of control. Particularly, a risk management model used to calculate insurance premiums for human drivers can be adapted, particularly extended, to autonomous driving units.

Alternatively or additionally, a computer system is configured. For instance, the computer system may be a system for simulating driving of the vehicle for testing and/or design adaptation, and/or statistical forecasting. The computer system can particularly be a system for improving the autonomous driving software design, operation effectiveness, e.g. the man-machine interface, algorithm thresholding related to man-machine interface and/or coordination and sundry statistical forecasting. The computer system may be adapted to obtain more realistic simulation results, improve remedial feedback to the driver, improve precision of statistical forecasting and sensor design and algorithm thresholding for purposes of speed determination, angular orientation, and/or GUI and/or warning thresholds related to request for change of control from AI to operator and detection of operator assumption of control, amongst others.

Alternatively or additionally, the computer system may be a system for computing a relative and/or absolute driving risk embodied in an autonomous driving system and/or individual operator related to sequential and co-occurring phases of operator and/or AI control for said autonomous vehicles or category of autonomous vehicles. The computer system may further be adapted to obtain more realistic costs associated with the actual driving of the autonomous vehicle.

A remedial information is outputted, for instance feedback for development of the autonomous driving unit, particularly autonomous driving software/AI and/or hardware, and/or for human driver educational purposes. Particularly, if atypical autonomous driving situations are considered, feedback could also be given to a human driver as incentive for better handling takeover of control, e.g. increased awareness of driving situations during autonomous control. Alternatively or additionally, an usage-based product liability for vehicle insurance of autonomous vehicles is indicated, e.g. outputted via an internal or physical interface such as a monitor or printer.

An insurance premium for the operation of the vehicle or a vehicle fleet, e.g. of an AVSP, is calculated. For example, this calculation of a representative single rate per vehicle fleet can be performed by a weighted average.

Tunable autonomous vehicle AI parameters or algorithms can be modified within the domain limits of adjustability, e.g. via using the accident event-occurrence estimate associated with the determined driving quantity or the trend thereof.

An event database is generated or complemented. In this database, event data obtained by associating the at least one driving quantity with temporal information related to the driving of the vehicle and/or functionality of the vehicle is stored. Such temporal information may be, for instance: a point in time or time interval on/during which the transfer of control occurred; duration of autonomous and/or manual driving without occurrence of an accident; duration of usage of the vehicle or the autonomous driving unit; duration of driving under control of the autonomous driving unit; time interval between the signaling of required takeover of control and actual takeover of control by the human driver; frequency of changes (updates, modifications) or time elapsed since the last change to the autonomous driving unit, e.g. code changes to the autonomous driving software and/or hardware; and/or frequency of modifications or time elapsed since last modification of a man-machine interface for signaling required takeover of control.

In particular, the determined driving quantity, in particular the event database generated or complemented on the basis thereof, also allows to monitor the driving quality of autonomous and/or manual driving (in the context of atypical driving situations) over periods of time. Accordingly, an early warning can be outputted to an autonomous vehicle manufacturer or development staff, or insurer, and/or a human driver or passenger of the vehicle. Particularly, if it can be determined based on the corresponding driving values in the context of transfer from autonomous to manual control that the manual driving quality has degraded, an early warning of e.g. human neural aging or diseases such as liver cirrhotic or active alcoholic abuse can be provided.

Preferably, such warnings can be output if the driving safety associated with the driving quantity falls below a predetermined safety limit. Based on such a warning, vehicle maintenance or driver medical certification can be initiated.

Alternatively or additionally, the information stored in the event database allows for evaluating the effect of changes to the autonomous driving unit, particularly to autonomous driving software/AI and/or hardware associated with autonomous driving. What is more, the information stored in the event database allows for prediction of future autonomous operation and/or transfer of control performance.

Alternatively or additionally, the determined driving quantity, in particular the event database, can be used to acquire autonomous vehicle or software and/or hardware accreditation, i.e. to attest a required level of driving safety. Thereby, such accreditation can be obtained with minimal effort, as much less test drives are required compared to conventional accident statistics acquisition.

It is also possible to utilize the event data stored in the event database for training of a neural network. Particularly, based on the event data, it is possible to train the neural network for assessing the effectiveness and/or safety of a vehicle control takeover event. For example, by presenting the neural network with an assessment of a takeover event, i.e. the driving quantity and the corresponding driving values, the neural network can learn to assign safety or efficiency ratings to the autonomous driving unit and the human driver of vehicles solely on the driving values.

Alternatively or additionally, the temporal information related to the driving of the vehicle and/or functionality of the vehicle may also be utilized for determining the at least one performance quantity. Particularly, the at least one driving quantity quantifying the quality of interplay between the autonomous driving unit and a human driver may be determined based on driving values obtained by the monitoring with respect to the detected change in driving mode and on temporal information related to the driving of the vehicle and/or functionality of the vehicle. For example, the temporal information may be used to adjust a weighting of the driving values used to determine the at least one driving quantity. For example, emphasis can be put on recently obtained driving values, such that driving values older driving values only contribute marginally—if at all—to the determination of the at least one driving quantity. In other words, the reference point(s) for comparing the current driving of the vehicle or change in driving mode, respectively, may be adapted based on the temporal information.

Particularly, a second aspect of the invention relates to a method for improving operation of a vehicle comprising an autonomous driving unit configured for autonomously controlling the vehicle and a control takeover management unit configured for passing over control to a human driver. The method includes the steps of: (i) by a detection unit arranged in the vehicle, detecting a change in the driving mode from autonomous driving to manual driving, including at least one of: determining a point in time a control takeover request is outputted by the control takeover management unit, determining a point in time the human driver takes over control from the autonomous driving unit, and determining a point in time the human driver assumes safe control over the vehicle; (ii) by a sensor unit arranged in the vehicle, monitoring at least one driving parameter during the autonomous driving unit and/or the human driver controlling the vehicle; (iii) by an evaluation unit, based on driving values provided by the sensors unit upon monitoring the at least one driving parameter during a time interval ending at, starting from or including a point in time determined by the detection unit, determining at least one driving quantity quantifying the quality of interplay between the autonomous driving unit and the human driver; (iv) by a configuring unit arranged in a computation facility, based on the at least one determined driving quantity, configuring a risk management model for assessing the effectiveness and/or safety of control takeover events in a vehicle containing an autonomous driving unit and a takeover management unit; (v) by a computer system arranged in the computation facility and comprising the risk management model, outputting assessment data obtained by executing the configured risk management model; and (vi) using the outputted assessment data for operation of the vehicle.

An autonomous driving unit, in the sense of the present invention, is preferably one of: an autonomous driving hardware, an autonomous driving software, or a combination thereof. For example, an autonomous driving unit may comprise corresponding circuits, sensors and the like on the one hand, and/or an artificial intelligence controlling the vehicle.

A control takeover management unit, in the sense of the present invention, is preferably a device for orchestrating the passing over of vehicle control from the autonomous driving unit to the human driver. The control takeover management unit may comprise corresponding software modules and/or corresponding hardware modules. Particularly, the control takeover management unit may contain an interface, in particular a man-machine-interface, for signaling the human driver the necessity for manual control, and/or at least one sensor device for detecting control exerted by the human driver (e.g. detection of hands on the steering wheel, force exerted on the steering wheel, pedal depression, and/or the like). Alternatively or additionally, the control takeover management unit may be configured to provide remedial information to the driver specific to their response to a control takeover request and their exertion of manual control over the vehicle (immediately) after the takeover event.

A configuring unit, in the sense of the present invention, is preferably a device or module for adjusting the risk management model, particularly for initializing and/or updating the risk management model. For example, the configuring unit may be a software containing an algorithm for adjusting the risk management model. Additionally or alternatively, the configuring unit may comprise an interface for receiving data, particularly the determined at least one driving quantity, and conveying the received data to the risk management model.

A sensor unit, in the sense of the present invention, is preferably a dedicated component or part of a system configured to substantially continuously detect, particularly measure, a quantity characteristic of the driving of the vehicle. For example, the sensor may be a speed sensor directly detecting the speed of the vehicle. Particularly, the sensor may be a speedometer having an interface for providing speed values as driving parameter values to the quantity determining module. Alternatively or additionally, the sensor may be an acceleration sensor directly detecting g-forces. Particularly, the sensor may be or comprise an accelerometer, e.g. a piezoelectric sensor measuring the acceleration of a test mass coupled to a piezoelectric system, or a MEMS (micro-electro-mechanical system) on an integrated circuit. Alternatively or additionally, the sensor may be or comprise a sender sending signals for locating the vehicle, i.e. a sender part of a positioning system such as GPS, Galileo, GLONASS, or Beidou—with or without augmentation to achieve centimeter locational accuracy. From these signals, a position of the vehicle can be determined, and if required, other driving parameters such as speed and acceleration can be determined as well (by derivation from a position time series).

The driving values obtained by monitoring a particular driving parameter such as speed, acceleration, angular change and/or the like with such a sensor can be received by an evaluation unit. For example, the driving values or representative data can be sent via an over-the-air interface, e.g. in form of radio signals, to the quantity determining module. For instance, the vehicle and/or the quantity determining module may be configured for establishing a communication connection, particularly an internet connection, in order to transfer the driving values. To this end, the vehicle preferably has a corresponding sender.

The evaluation unit is preferably part of a data processing center, particularly a server. For example, the evaluation unit may be arranged in the computation facility. The data processing center/computation facility may comprise a receiver, e.g. a radio receiver or an internet connection, to receive the driving values. The evaluation unit may be a software module, into which the driving values are fed, e.g. in form of parameters, upon reception. The evaluation unit may run or be executed on a processor of the data processing center/computation facility. Alternatively or additionally, the evaluation unit may comprise hardware, e.g. integrated circuits, configured for determining the driving quantity.

Alternatively, the evaluation unit is arranged in the vehicle. Particularly, the evaluation unit may be part of the vehicle. For example, the evaluation unit may be a software module run or be executed on a processor of the vehicle, e.g. the vehicle's ECU.

The evaluation unit is preferably configured to compare, in particular to execute a comparison of, each received driving value to a geostationary value of the same driving parameter, i.e. a value of the parameter tied to the current position of the vehicle. For instance, a speed value (i.e. the current speed of the vehicle) can be compared to a speed limit or a prevailing speed of other vehicles, e.g. an average speed. The comparison result, e.g. the difference, is termed a resulting value.

Alternatively, a plurality of driving values may be combined to a resulting value.

Preferably, the evaluation unit is further configured to consolidate, in particular to execute a consolidation of, a plurality of such resulting values to a driving quality value, which can be the mean, median or other mathematical resume of the resulting values. For example, the resulting values determined from driving during a driving period are consolidated to a driving quality value.

A driving quality value may be used as a driving quantity. Or a plurality of driving quality values collected during a superior driving period are consolidated to a driving quantity, which can be the mean, median or other mathematical resume of the driving quality values. The superior driving period may allow to characterize the driving of the driving unit in general, like at least over one year, or at least over 10,000 km collected driving distance.

Preferably, the event database is also part of the above-mentioned data processing center. The database may be formed on a storage device, particularly a memory system optionally containing one or more storage media, in particular optical, magnetic, solid state and/or other non-volatile media. The database is preferably accessible by the pre-selecting module. In other words, the pre-selecting module may execute or initiate a search or data selection in the database, e.g. in the memory system.

The computer for performing an action based on the determined driving quantity may be part of the data processing center as well. In particular, the data processing center may comprise hardware and/or software configured to perform, particularly execute, any of the above-mentioned actions. Alternatively, the computer may be a separate device, possibly located at a different location and operating independently of the data processing center. In this case, the computer and the data processing center are preferably connected for communication, e.g. over a network such as the internet, such that the determined autonomous-driving accident rate can be received by the computer.

A driving quantity quantifying the quality of interplay between the autonomous driving unit and a human driver in the sense of the present invention particularly represents a quantity describing the overall or combined driving quality of a vehicle, wherein the vehicle is temporarily controlled by the autonomous driving unit and temporarily controlled by the human driver. In particular, the at least one driving quantity is a measure for the driving behavior of both the autonomous driving unit and the human driver, wherein the effect of the driving of the autonomous driving unit on the driving of the human driving and/or vice versa is considered. Alternatively, the driving quantity may be a measure for the driving behavior of only the autonomous driving unit, e.g. during a time interval leading up to a takeover of control by the human driver, and/or in between the output of the takeover request and the human driver taking over control. In a further alternative, the driving quantity may quantify the driving only of the human driver, particularly immediately after his assumption of control. For example, the driving quantity can be a measure for the driving behavior of only the human driver from the actual takeover of control until the point in time the driver assumes safe control over the vehicle. In all of these alternatives, the driving may at least partially influenced by the driving of the autonomous driving unit immediately prior to the takeover request and/or actual takeover of control.

A point in time the human driver assumes control over the vehicle in the sense of the present invention corresponds to a point in time the driver has well settled into full control of the vehicle. In other words, this point in time is reached when the driver is fully aware of and has adapted to the current driving situation. For example, a point in time the driver takes over control from the autonomous driving unit may be reached as soon as the driver places his hands on the steering wheel after being requested so by the control takeover management unit. However, this does not mean the driver safely operates the vehicle. Rather, some time will be required for the driver to adapt to the current traffic scenario. Only then, the point in time the driver has assumed safe control over the vehicle will be reached.

Such point in time may correspond with by a significant increase in driving quality, e.g. with less erratic driving. Alternatively or additionally, it may be assumed that the safe driving state is reached after a sufficient amount of time after the actual takeover of control has lapsed. Accordingly, the point in time the driver assumes safe control over the vehicle may be a predetermined time after the actual takeover of control occurred, e.g. 30 seconds thereafter.

An aspect of the invention is based on the approach that for comprehensive testing of an autonomous driving unit, e.g. an autonomous driving system or at least its software, it is advantageous to not only consider and possibly rate its reactions in a variety of traffic scenarios, i.e. driving situations, but also to consider and possibly rate the reactions of the human driver in traffic scenarios into which he is thrown after taking over vehicle control from the driving unit. Analyzing e.g. driving values obtained by monitoring driving parameters as speed, acceleration or deceleration immediately before and/or after a change in driving mode from autonomous driving by the autonomous driving unit to manual driving by the human driver may allow to more precisely assess the capability of the autonomous driving unit to recognize and/or handle particularly complex and demanding situations. In particular, based on these driving values, at least one driving quantity may be derived which quantifies the quality of man-machine interactions between the autonomous driving unit and human driver. In other words, it has been realized that there is a human component which should be factored into the testing and/or rating of a, in particular level 1-3, autonomous driving unit.

For example, an autonomous driving unit may be capable of handling most of the usually occurring traffic scenarios. Thus, if only purely autonomous driving is tested, the driving unit will rate exceptionally well, although its ability to access a scenario too complex in advance and warn the driver accordingly may be only poor. This will result in situations where the driver might have insufficient time to take over control and react accordingly to prevent an accident. Such failure of the driving unit will generally not be recognized by the usual testing methods, because the driving mode will have changed to manual control and thus the human driver will be incorrectly held liable for the accident.

Thus, by detecting the change of the driving mode from autonomous driving to manual driving and taking it into account when e.g. determining quantities reflective of the quality of combined driving of the driving unit and the human driver, the autonomous driving unit may be tested more extensively. In particular, by this means a weak point of an autonomous driving unit can be detected such that e.g. the corresponding software may be enhanced to improve the control takeover procedure. Further, it becomes possible to compare driving quantities obtained with regard to a change in driving mode to augment the autonomous driving software, e.g. feeding data corresponding to driving quantities indicative of high quality driving to a neural network in order to train the autonomous driving unit.

For example, quantifying the quality of interplay between the autonomous driving unit and human driver may be based on quantities quantifying the quality of driving of the human driver directly after he has taken over control of the vehicle. Alternatively or additionally, quantifying the quality of interplay between the autonomous driving unit and human driver may be based on quantities quantifying the quality of driving of the autonomous driving unit even before the autonomous driving unit outputs a control takeover signal due to a complex traffic scenario. This way, e.g. the capability of the autonomous driving unit to assess complex traffic scenarios and potentially its effect on the driving behavior of the human driver may be taken into account, for example be rated. In particular, if these quantities are reflective for a high quality of driving, in particular better than average, this may indicate an effective design of the critical man-machine aspects of the driving unit with respect to alerting the driver for imminent transfer of control.

A further aspect is that the human driver and the autonomous driving unit may be understood as one entity. As such, the entity comprising the autonomous driving unit, in particular the corresponding control software, and a specific human driver can be rated with regard to their combined driving quality. I.e. the autonomous driving unit and the human driver may not only be rated separately with a score reflective of the driving quality, but together. This rating score may be a useful measure not only for software improvement or redesign, but also for calculating an insurance risk or a premium, respectively, for an insurance company insuring vehicles which comprise this of driving unit or make use of this software, respectively. The rating score of the insurance risk is a fine indicator for usage-based product liability for autonomous vehicle insurances.

For example, the outputted assessment data may form the basis for an update of the autonomous driving unit. Alternatively or additionally, the assessment data may form the basis for an insurance premium or liability attribution, such that the autonomous driving unit and/or human driver, particularly their combination, can operate the vehicle e.g. according to legal regulations, or in case of an accident occurring during the control takeover event, liability can be attributed to the autonomous driving unit or the human driver or be shared among both. In this sense, "operation of the vehicle" encompasses costs of operation, e.g. insurance premiums.

In the sense of the present invention, obtaining driving values by monitoring with regard to the change in driving mode can be understood as grouping the obtained driving values, in particular processing the obtained driving modes depending on the respective group. For example, a driving value obtained immediately before the change in driving mode may be used to determine a driving quantity which is combined or at least compared to with a driving quantity determined from driving value obtained immediately after the change in driving mode to determine the at least one driving quantity quantifying the quality of interplay between the autonomous driving unit and the human driver. In particular, the at least one driving quantity may be determined based on the temporal relationship, e.g. the temporal distance, of the respective points in time at which the driving values relative to the change in driving mode, e.g. relative to a point in time at which the human driver takes over control of the vehicle.

An autonomous vehicle in the sense of the present invention can be a vehicle with a software for controlling the driving of the vehicle completely, e.g. levels 4 and 5, or only partly, e.g. level 1 to 3. Therein, the software may be also referred to as an artificial intelligence (AI).

A driving parameter in the sense of the present invention can be the speed of the vehicle, an acceleration of the vehicle, either positive or negative, in driving direction, or sideward, a combination of speed and acceleration and/or a combination of different accelerations, e.g. during a predefined time span, a steering wheel turning parameter, e.g. a turning angle, turning rate per time, subsequent turning angles in different directions, a pedal activation parameter, e.g. pressing force, pressing velocity, or the like.

A driving quantity can be a one-dimensional quantity, e.g. a single value, or a multi-dimensional quantity, e.g. a vector with a multitude of values, which quantifies a driving quality of the driving of the autonomous driving unit or the human driver, respectively. A driving quality may be quantified by a comparison of values of a driving parameter, like speed, acceleration or turning of the steering wheel, with a geostationary parameter value, like a speed limit or a parameter value of other driving occurring at the same location. If the autonomous driving unit or the human driver drives faster than a speed limit or a prevailing driving speed of surrounding vehicles, the resulting value, like the speed difference or another value derived from the comparison, is an indicator of the driving quality. Generally, the faster the driving, the higher the resulting value, the worse is the driving, and the other way around.

Values of a driving parameter, like speed, acceleration or steering wheel turning angle, or the like, may be determined during the driving of the autonomous driving unit and/or the human driver. These values are called driving values.

Each driving value may be compared to a geostationary value of the same parameter, e.g. a speed limit, a prevailing speed, or another parameter value of other vehicles at the same location. The comparison result is preferably a value. Alternatively, a plurality of driving values may be combined to a resulting value.

A plurality of such resulting values may be consolidated to a driving quality value, which can be the mean, median or other mathematical resume of the resulting values. For example, the resulting values determined from driving during a driving period are consolidated to a driving quality value.

A driving quality value may be used as a driving quantity. Or a plurality of driving quality values collected during a superior driving period encompassing a corresponding plurality of driving values are consolidated to a driving quantity, which can be the mean, median or other mathematical resume of the driving quality values. The superior driving period may allow to generally characterize the combined driving of the autonomous driving unit and the human driver, e.g. during an extended period of time or/and a significant accrual of mileage—that is at least over one year, or at least over 10,000 km recorded driving distance, possibly in varied locales such as: urban, rural or highway, respectively.

A driving quantity is preferably based on driving values of a particular type of driving parameter, e.g. from values obtained by monitoring the vehicle speed or the vehicle acceleration. Preferably, each driving value of the same driving parameter is generated in the same way, e.g. all acceleration values are obtained by means of the same accelerometer. Alternatively, a driving quantity may be based on driving values of multiple driving parameters, in particular a combination of driving parameters. For example, a driving quantity may be based on a measured time interval and measured vehicle speed.

Preferably, the driving quantity is a driving quality metric. A driving quality metric can be a driving quantity which is determined for a plurality of autonomous driving units or human drivers, respectively, in the same way, so that the quantities are comparable and rankable, preferably for at least 1,000 autonomous driving units or human drivers. A superior driving period of a metric is called metric period in the following.

A driving period can be a single or a plurality of journeys of the vehicle, or all journeys of the vehicle during a predetermined time span, like ten days, a month or a quarter of a year. A driving period can further be a sub-period of a single or a plurality of journeys, e.g. grouped by day/night, or weather.

Driving quantities may be determined in different categories, each category using different types of driving values, as for example speed, acceleration, deceleration, and the like or a combination thereof. In particular, from one or more driving parameters being monitored during autonomous or manual driving a plurality of quantities of different categories can be determined.

To distinguish between different driving areas in which the driving risk may differ due to area characteristics, it is advantageous if the categories are a plurality of different locale categories where the driving parameter is monitored. The locale categories can be urban, rural and highway, or other specific driving surroundings such as "suburban" or "urban-business".

As outlined above, a plurality of different categories of driving quantities can be generated during a driving period of one vehicle. The categories can be differentiated with regard to type, e.g. speed and acceleration events. Further, the categories can be differentiated into different locales where the driving values are gathered. Types and locales may be independent from one another. Accordingly, during one time period, more than one driving quantity can be determined. In other words: preferably, a plurality of quantities are determined for different categories of driving quantities, in particular for different locales and/or for different types of driving parameters.

To obtain a rating corresponding to a determined driving quantity quantifying the interplay between the autonomous driving unit and the human driver, e.g. quantifying the quality of driving of the entity containing the autonomous driving unit and the human driver, the driving quantity can be compared with other driving quantities, preferably of the same type and locale. A suitable rating parameter is the quantity as such. This rating of a quantity against a plurality of quantities contained e.g. in a database may result in a rating value, like 43%, which means, that 57% of all metric values of the database show a statistically better driving and 43% show a worse driving.

Alternatively or additionally, it is possible to rate quantities with regard to the locale of the driving quantity and/or use the respective locale for a driving risk assessment. This is particularly advantageous because usually, driving on rural roads is considered more dangerous as driving on expressways, and driving in downtown traffic is more dangerous than driving on a well-built and wide rural road. In other words: a driving risk strongly depends on the location where the driving occurs, or more general: the area category. It is advantageous, therefore, if the rating is categorized into multiple different area categories where the driving event—from which the quantities are calculated—occurred.

In the following, preferred embodiments of the invention and their modifications will be described which may be combined with each other as well as with further aspects of the invention as far as its not explicitly excluded.

In a preferred embodiment, the at least one driving quantity is determined also based on an information regarding a software and/or hardware change in the control takeover management unit. Particularly, the information regarding the software and/or hardware change may be used to adjust a weighting of the driving values used to determine the at least one driving quantity. For example, emphasis can be put on driving values obtained after the software and/or hardware change, such that driving values obtained prior to the change only contribute marginally—if at all—to the determination of the at least one driving quantity. In other words, the reference point(s) for comparing the current driving of the vehicle or change in driving mode, respectively, may be adapted.

For example, the at least one driving quantity can be determined by means of Kalman filtering. In this case, the Kalman gain determines the influence of recent driving values versus older driving values on the at least one driving quantity. If the information on an interface change conveys that the interface has indeed been subject to a change, the Kalman gain may be adapted such that only or at least predominantly the recent driving values contribute to the at least one driving quantity.

Detecting the change in driving mode includes determining the point in time a control takeover request is outputted by the autonomous driving unit and determining the point in time the human driver takes over control. By this means, the driving values may be grouped at least into a period prior to the outputting of the control takeover request, a period in between the outputting of the control takeover request and the human driver taking over control, and a period after the human driver takes over control. Further, the at least one driving quantity may be determined based on a, in particular specific, combination of driving values from these different groups or periods, respectively. For example, the driving values from different periods may be differently weighted. This allows for a particular differentiated analysis of vehicle control, e.g. rating of the combined driving of the autonomous driving unit and the human driver. The rating may be suitable e.g. with regard to a user based insurance, for example to determine premiums. Further, this differentiated analysis of vehicle control may provide information based on which a global wear of the vehicle may be estimated, the information being usable e.g. to assess the vehicles value.

In particular, detecting the change driving mode may include identifying different stages of the transfer of control, wherein in each of the different stages, the autonomous driving unit or the human driver may exhibit different driving behavior, respectively.

For example, in a first stage, the control may be solely associated with the autonomous driving unit. The first stage preferably reaches up to the point in time where the autonomous driving unit outputs the control takeover request, which may be referred to as the control takeover request event. In other words, the first stage preferably covers the usual autonomous driving mode where responsibility for controlling the vehicle lies exclusively with the autonomous driving unit. The first stage may thus also be referred to as "AI-assisted control", wherein a metric based on driving values allows for rating the performance of the autonomous driving unit in basically all usually occurring traffic scenarios.

In a second stage, for example, the control of the vehicle may still be solely associated with the autonomous driving unit. However, the second stage may reach from the control takeover request event up to the point in time the human driver takes over control, which may be referred to as the control takeover event. During this stage, the focus may be not only on how the autonomous driving unit performs in the given situation, but rather how the driving will affect the situation the human driver finds himself in when he takes over control. Although control of the vehicle still lies with the autonomous driving unit, a metric based on driving values obtained in the second stage allows for rating the performance of the autonomous driving unit with respect to particularly complex traffic scenarios. The second stage may also be referred to as the "transfer of control".

In a third stage, for example, the control of the vehicle may be associated with the human driver. The third stage preferably reaches from the control takeover event up to a point in time at which the human driver has adjusted to the current traffic scenario and no immediate consequences of his recent takeover of control are to be expected. In other words, the third stage may cover the time interval in which the human driver has to resolve the complex traffic scenario the autonomous driving unit has gotten him into, i.e. extend until the driver assumes safe control over the vehicle. Preferably, the duration of the third stage corresponds to a predefined second time interval, e.g. at least 30 seconds, in particular at least one minute, after the takeover control event. The third stage may be referred to as the "default to manual control", wherein a metric, even though based on driving values solely obtained during manual control, allows for rating the control handover performance of the autonomous driving unit.

For example, if the human driver has to brake hard directly after taking over control from the autonomous driving unit, this could be interpreted as negatively affecting the rating of the autonomous driving unit by increasing e.g. a driving quality value associated with the driving quantity (as the hard breaking corresponds to strong deceleration), because the autonomous driving unit e.g. failed to output the control takeover request early enough or did not drive defensively enough during the second stage.

In a fourth stage, for example, the control of the vehicle may be associated with the human driver. The fourth stage may cover all the manual driving performed by the human driver after he has adjusted to the traffic scenario in which he is taking over control, e.g. starting from the end of the predetermined second time interval after the control takeover event. During this stage, a metric based on driving values obtained during manual control relates solely to the driver and can be e.g. used to compare the quality of driving of the human driver to the quality of driving of the autonomous driving unit. The fourth stage may be referred to as "manual control".

In another preferred embodiment, monitoring the at least one driving parameter includes determining the time interval between the autonomous driving unit outputting a control takeover request and the human driver taking over control, e.g. determining the time interval between the control takeover request event and the control takeover event. In other words, monitoring the at least one driving parameter includes measuring the time needed for the human driver to take over control. The time lag determined in this manner may be used to quantify how effective the takeover mechanism implemented by the autonomous driving unit is in getting the required human control and/or how attentive the human driver-to-be is. In particular, by determining the driving quantity based on the time interval, the intertwined impact of both hand over alert design and driver alertness may be captured. In this case, the driving quantity may also referred to as "time lag metric".

In another preferred embodiment, the at least one driving quantity is determined based on the time interval between the autonomous driving unit outputting a control takeover request and the human driver taking over control, and a vehicle dynamic variable during the time interval. In particular, determining the at least one driving quantity may include weighting the time interval between the autonomous driving unit outputting a control takeover request and the human driver taking over control with the vehicle dynamic variable. In other words the time lag metric then includes a vehicle dynamic variable. By this means, the impact of the time lag between the control takeover request event and the control takeover event, during which period the control of the autonomous driving unit may be insufficient or at least suffer from the incapability of the autonomous driving unit to comprehensively evaluate the complex traffic scenario and/or the ineffectiveness of the method of signaling the driver for take-over, on the rating of the autonomous driving unit may be easily adapted to reflect the safety of the vehicle during this period.

Preferably, the at least one driving quantity determined based on the time interval and the vehicle dynamic variable is compared to driving quantities determined previously for the same autonomous driving unit and/or the same driver, in particular in similar environments and/or traffic scenarios. If, for example, this comparison shows that previously better time-lag values or earlier control takeover timings of said driver were determined, a statistically or otherwise determined significantly extended takeover time-lag may be interpreted as suspicious and likely due to driver inattention. Analyzing the driving quantity determined based on the time interval and the vehicle dynamic variable may thus be helpful in pinpointing deficiencies e.g. in the signaling and eliminate them accordingly. Further, the analysis may also be suitable to assess liability e.g. in case of an accident during the second stage of the change in driving mode.

A vehicle dynamic variable can, for example, be the vehicle speed, the acceleration, the deceleration, the yaw rate, the rotational frequency, and/or the like. Because during the time interval from the control takeover request event to the control takeover event the vehicle dynamic variable can change, e.g. by acceleration of the vehicle, the average of the vehicle dynamic variable may be used to determine the at least one driving quantity, in particular to weight the determined time interval.

In an example, the time interval or duration for the human driver to take over control after being requested so by the autonomous driving unit is multiplied by the average vehicle speed during this period. Weighting the time interval with the (average) vehicle speed effectively indicates a distance the vehicle travels in between the control takeover request event and the control takeover event. Hence, the magnitude of the time lag has a radically different impact on the driving quantity if the same time lag occurs at 120 km/h or at 20 km/h.

In particular, the at least one driving quantity may be determined based on a distribution or at least a part of a distribution of the time interval weighted by the dynamic driving variable, wherein the distribution is preferably generated by monitoring the time interval and the dynamic driving variable during a driving period, e.g. a plurality of journeys of the vehicle. Preferably, the distribution or at least a part of the distribution may be mathematically processed to obtain the at least one driving quantity, for example by averaging, determining the median and/or the like.

The time lag metric obtained this way may be easily ranked, e.g. by comparing it to an average time lag metric obtained from multiple different vehicles with autonomous driving units and different drivers.

In another preferred embodiment, the at least one driving quantity is determined based on the product of the time interval and the vehicle dynamic variable during the time interval, wherein said product reaches or exceeds a, in particular predefined, threshold. In particular, the weighted time interval is evaluated, i.e. processed for determining the at least one driving quantity, only if it reaches or exceeds a predefined threshold. By this means, it is possible to focus on control changes associated with a high accident risk, e.g. where it takes the human driver particularly long to take over control from the autonomous driving unit and/or where the autonomous driving unit transfers control to the human driver at high speeds.

For example, it is possible to only consider, i.e. evaluate, only those transfers of control, i.e. those second phases, in which the product of the vehicle dynamic variable and the time interval, in particular the weighted time interval, reaches or exceeds an average time lag metric obtained from multiple different vehicles with autonomous driving units and different drivers. It is particularly preferable to only consider those transfers of control in which the product of the vehicle dynamic variable and the time interval, in particular the weighted time interval, lies in the fourth quartile. Given that during a driving period, not too many changes of control are to be expected, considering only e.g. the 25% worst cases or scores, respectively, allows to focus on the most meaningful cases in terms of causation of AI assisted driving accident events.

In another preferred embodiment, the driving values obtained by the monitoring are stored for a predetermined storage time interval spanning at least from a point in time before a control takeover request is outputted by the autonomous driving unit to the point in time the autonomous driving unit outputs the control takeover request. Preferably, the predetermined storage time interval spans at least from the point in time before a control takeover request is outputted to the point in time the human driver takes control. This not only allows to determine the quality metric retrospectively, i.e. with the knowledge that the change in driving mode occurred, but the driving values stored prior to the control takeover request event can also be evaluated in view of the deterioration of the autonomous driving when e.g. a complex traffic scenario comes up.

For example, the stored driving values or the at least one driving quantity derived thereof, respectively, can be used to check whether the driving stabilizes e.g. after the control takeover request was outputted or whether it deteriorates further. From this analysis, the liability e.g. in case on an accident may be assessed. Further, this analysis may assist in pinpointing deficiencies e.g. in the software of the autonomous driving unit and enhance it accordingly.

In particular, by storing driving values already obtained before the control takeover request event, e.g. in the first stage, information is available on the driving behavior of the autonomous driving unit leading into the complex traffic scenario which the autonomous driving unit may not be able to safely resolve. Preferably, this information is considered in the determination of the at least one driving quantity, in particular in a driving quantity quantifying the quality of driving of the autonomous driving unit during the second stage, e.g. during the transfer of control. This allows a particularly valuable insight into the capability of the autonomous driving unit to assess complex traffic scenarios and interact accordingly with the driver.

For example, the at least one driving quantity determined from the stored driving values is compared to a driving quantity quantifying the unimpaired driving of the autonomous driving unit during the first stage. By this it can be tested whether the quantity determined from the stored driving values differs significantly from a previously determined quantity for the autonomous driving prior to the predetermined storage time interval, e.g. whether a difference between these two exceeds a predefined threshold. Thus, it can be assessed whether or how much earlier the control takeover request could have been outputted. Alternatively or additionally, the observed or measured lag between a significant deviation of the at least one driving quantity determined based on the stored driving values and quantity determined during the first stage can be compared with that observed from other autonomous navigation solution providers. In other words, this allows to determine systematically whether there is an earlier point in time to request control of the driver, because a degradation in autonomous driving was accessible earlier on. That information may be used to enhance the autonomous driving unit. Further, that information may be helpful for a forensic understanding e.g. of an accident.

To ensure sufficient information regarding the driving behavior of the autonomous driving unit prior to the control takeover request event, the predetermined storage time interval may extend for at least one minute, preferably at least two minutes, in particular at least four minutes. Advantageously, the driving values are stored for at least 10 minutes. This allows for recording sufficient data, i.e. driving values, to capture dynamic events leading up to the autonomous driving unit outputting the control takeover request and/or transpiring during the second stage, i.e. before the control takeover event. This enables critical insight into this highly accident-prone period.

Preferably, the driving values are stored in a storage unit, e.g. a data buffer, which may advantageously be a centralized storage unit and accessible via a network, e.g. the Internet. To this end, the vehicles, in particular the autonomous driving unit, may be connected to the storage unit via the network. Alternatively, the vehicle, in particular the autonomous driving unit, may comprise the storage unit which is configured to accumulate data which may then be evaluated e.g. after the current driving period.

The storage unit is preferably configured as a FIFO (first in, first out) buffer, in particular circular buffer. From the storage unit, the data, e.g. the driving values, can then be incrementally extracted to determine the at least one driving quantity.

In another preferred embodiment, the at least one driving quantity is a composite quantity. Preferably, the at least one driving quantity is determined based on driving quantities quantifying the quality of driving, in particular the driving behavior, of both the autonomous driving unit and the human driver. In particular, the at least one driving quantity may be determined based on an autonomous driving quantity quantifying the quality of driving of the autonomous driving unit during the first and/or second stage of the change in driving mode, in particular during a first time interval spanning from a point in time prior to the autonomous driving unit outputting a control takeover request event to the point in time the request is outputted, and/or on a manual driving quantity quantifying the quality of driving of the human driver during the third and/or fourth stage of the changing control. Considering the driving behavior during the different stages, e.g. of both the autonomous driving unit and the human driver, may provide a particularly precise assessment of the interplay between autonomous driving unit and human driver and thus the overall combined driving of the vehicle.

Additionally or alternatively, the at least one driving quantity is determined based on driving values obtained by monitoring more than one driving parameter. By this means, different driving situations may be the assessed adequately. For example, the at least one driving quantity may be determined based on vehicle speed and acceleration or deceleration, respectively. Given that strong acceleration can occur both at low speeds, e.g. when resuming driving after stopping at a traffic light which can be associated with safe driving, and at high speeds, e.g. when overtaking on rural road which can be associated with risky driving, this allows for a particularly nuanced rating of the overall driving quality.

In another preferred embodiment, the at least one driving quantity is determined based on an autonomous driving quantity quantifying the quality of the driving of the autonomous driving unit before the change in driving mode and on a manual driving quantity quantifying the quality of the driving of the human driver after the change in driving mode. In particular, the at least one driving quantity is determined based on an autonomous driving quantity during the first stage of the change in driving mode, i.e. before the control takeover request event, and on a manual driving quantity during the fourth stage of the change in driving mode, i.e. well after the control takeover event. By this means, the at least one driving quantity may represent the overall quality of driving of the vehicle in a particularly straightforward fashion and allows e.g. for a comprehensive and global rating.

Preferably, the at least one driving quantity is a mathematical function of the autonomous driving quantity and the manual driving quantity. The mathematical function may be a statistical description of the distribution of driving quality values obtained from e.g. a comparison of driving values with a predetermined value, e.g. a statutory speed limit or an average speed. Preferably, the mathematical function is based on one or more statistical moments of this distribution, in particular the variance. Using a statistical description for determining the at least one driving quantity may provide a particular robust and reliable rating of the overall or combined driving behavior of both autonomous driving unit and human driver.

In another preferred embodiment, the at least one driving quantity is further based on, in particular relative, mileage accumulated in the respective driving mode. In particular, the autonomous driving quantity and the manual driving quantity may be weighted by said mileage, in particular a ratio of said mileages. This enables robust scaling of the at least one driving quantity with e.g. the preference of the human driver to operate the vehicle predominantly in manual or autonomous driving mode.

In another preferred embodiment, the at least one driving quantity is determined based on an autonomous driving quantity quantifying the quality of the driving of the autonomous driving unit after a control takeover request is outputted by the autonomous driving unit and on a manual driving quantity quantifying the quality of the driving of the human driver subsequently to him taking over control. In other words, the at least one driving quantity is determined based on an autonomous driving quantity during the second stage of the change in driving mode, i.e. after the control takeover request event and before the control takeover event, and on a manual driving quantity during the third stage of the change in driving mode, i.e. after the control takeover event and before the human driver has adjusted to the current traffic scenario. In particular, the at least one driving quantity is determined based on a manual driving quantity quantifying the quality of manual driving during the predetermined second time interval subsequently to the human driver taking over control. This allows to closely monitor the dynamics of control takeover, in particular with focusing on the man-machine interaction between the autonomous driving unit and human driver, e.g. on the impact of the autonomous driving prior to complex traffic scenarios on the subsequent manual driving, and accordingly rate the entity of autonomous driving unit and human driver in order to pinpointing deficiencies e.g. in the man-machine interaction and enhance them accordingly. Further, its imaginable to utilize such rating for a user based insurance.

In another preferred embodiment, at least one driving quantity is further based on accident rate values for autonomous driving or manual driving after a takeover control request is outputted by the autonomous driving unit, in particular during the second stage of the change in driving mode, and subsequently to the human driver taking over control, in particular during the third stage of the change in driving mode, respectively. In particular, the autonomous driving quantity and the manual driving quantity may be weighted by the respective accident rate values. This allows for a particularly nuanced rating of the combined autonomous and manual driving of the vehicle during the change in driving mode.

Taking into account the respective accident rate values, i.e. the nominal percentage of accidents under autonomous control during the second stage and the nominal percentage of accident under manual control during the third stage, instead of e.g. the mileage accumulated during these stages may ensure sufficient computational impact, in particular a realistic scaling, on the determined driving quality.

The accident rate value for manual control, i.e. during the third stage, can e.g. be determined from insurer records. The accident rate value for autonomous control, i.e. during the second stage, may be determined based on an association of accident rate values for manual driving to an according autonomous driving. In particular, accident rate values obtained for a particular driving quality of manual driving may be associated with autonomous driving of a corresponding driving quality. To this end, an autonomous driving quantity may be associated to a plurality of manual driving quantities which have been determined e.g. from the same driving parameter during manual driving periods of different drivers such that from accident rate values associated to those manual driving quantities an autonomous driving accident rate value be determined.

Alternatively, the accident rate value for autonomous control may be determined as a nominal performance parameter from Autonomous Navigation Solution Providers, at least as long no reliable insurer records in this regard exist. Additionally, this value may be updated as the percentage of autonomously driven vehicles increases and credible records start to emerge.

In another preferred embodiment, the at least one driving quantity is determined based on driving values obtained by the monitoring during a predetermined first-time interval prior to the autonomous driving unit outputting a control takeover request. In other words, data indicative of the driving behavior of the autonomous driving unit immediately prior to the control takeover request event, i.e. during a part of the first stage, may be taken into account. In particular, this data may be used to determine the autonomous driving quantity quantifying the autonomous driving during the second stage of the change in driving mode, preferably in addition to data obtained during the second stage. By this means, the capability of the autonomous driving unit to assess traffic scenarios and recognize potentially overtaxing situations may be rated, potentially allowing to pinpoint and/or eliminate deficiencies e.g. in the software of the autonomous driving unit may or even determine an insurance premium.

Preferably, the predetermined first time interval corresponds to the predetermined storage time interval or at least part of it. By this means, the at least one driving quantity may be retrospectively determined, e.g. even after the change in driving mode occurred. Also, this allows to analyze the deterioration of the autonomous driving prior to a control takeover request being outputted.

In another preferred embodiment, the at least one determined driving quantity is interrelated to a quantity distribution of the same driving quantity. The quantities forming the quantity distribution are preferably obtained for a plurality of other vehicles, in particular reference vehicles, with an autonomous driving unit and different human drivers. Therein, the autonomous driving units of the other vehicles may be the same or those of other autonomous driving solution providers. Alternatively, the quantities forming the quantity distribution may be obtained from records for the same vehicle, for example from a databank which contains all driving quantities determined for that vehicle e.g. during a superior driving period. This allows to assess relative performance, in particular relative to other vehicles driven by different drivers and/or autonomous driving units, or relative to a usual driving behavior, i.e. driving style, of the present autonomous driving unit and/or driver.

In particular, the at least one determined driving quantity may be compared to a property of the quantity distribution, e.g. the average, the median or another mathematical measure characterizing the quantity distribution. This interrelation, in particular comparison, may be advantageously used to investigate the role of autonomous driving or human driving in the case of accidents, respectively. This may assist in pinpointing deficiencies e.g. in the software of the autonomous driving unit and enhance it accordingly. Further, this information may prove invaluable for e.g. insurance companies, as it might allow to determine whether liability lies with the autonomous driving unit or its manufacturer, respectively, or the human driver.

Preferably, interrelating the at least one driving quantity with the quantity distribution is part of a null hypothesis testing, wherein the null hypothesis may assume e.g. responsibility for an accident lies with the autonomous driving unit.

For example, if an accident occurs after the control takeover request event, the human driver may be held responsible if the time lag metric is larger than an average time lag metric obtained from a plurality of other vehicles or their own prior response characteristics. Alternatively or additionally, if the time lag metric is less than the average time lag metric, the autonomous driving unit may be held responsible. In this regard, "less than" or "more than" or "equal" can be assess in a statistical or other manner.

Additionally, it may be possible to determine a partial responsibility based on the magnitude of difference between the determined driving quantity and the corresponding average obtained from other vehicles. In other words, the more the determined driving quantity deviates from the norm defined by the average (or the median or another mathematical measure characterizing the quantity distribution, for that matter), e.g. relative to global or personal driver related norms, the more responsibility may be assigned to the autonomous driving unit or the human driver, respectively.

In another preferred embodiment, the at least one driving quantity is determined based on a quantity distribution, the quantity distribution being determined based on driving value data provided by a plurality of vehicles. Therein, the driving value data may characterize the driving behavior of the plurality of vehicles, in particular of autonomous driving units and/or human drivers thereof. Accordingly, the driving value data provided by the plurality of vehicles may be used for benchmarking the driving behavior of the autonomous driving unit and/or the human driver of the vehicle. Therefore, the plurality of vehicles may also be referred to as reference vehicles.

In other words, by determining the at least one driving quantity on the basis of the quantity distribution, the determined at least one driving quantity can correspond to a measure of the quality of the driving of the autonomous driving unit and/or the human driver of the vehicle with respect to the driving of autonomous driving units and/or human drivers of the plurality of (reference) vehicles.

Preferably, for determining the at least one driving quantity on the basis of the quantity distribution, the quantity distribution or the corresponding driving value data is read from a databank. The driving behavior of the autonomous driving unit and/or the human driver of the vehicle can then be compared to the average driving behavior of the driving units and/or human drivers of the reference vehicles, i.e. to a norm, in order to derive the at least one driving quantity.

If such databank does not exist, the method may comprise accumulating the driving value data. In particular, the driving value data may be obtained from monitoring at least one driving parameter of the plurality of vehicles during a predetermined driving period. In other words, driving quality metrics, based on which the quantity distribution may be derived or computed, respectively, may be compiled from a set of reference vehicles.

Therein, the reference vehicles or their drivers, respectively, may be selected from vehicles or drivers listed with an insurance company providing conventional automobile insurance, i.e. where premiums are fixed e.g. based on vehicle type, drivers age/driving experience, and/or the like. To reward such selected drivers for providing the driving values of their vehicles or allowing for a monitoring of the driving parameters of their vehicles, respectively, some inducement like a fee per mile driven may be offered.

Preferably, the reference vehicles are selected from vehicles or their drivers, respectively, who have mid-range to very good driving liability records with the insurance company. In other words, the driving value data may be obtained from reference vehicles based on the liability history with an insurance company. That is because it can be assumed that the autonomous driving unit of the vehicle will at least match the driving behavior of average drivers with respect to safety or accident risk, respectively.

In another preferred embodiment, the driving value data is generated by driving value statistic units provided in each of the plurality of vehicles. Preferably, the driving value statistic units monitors at least one driving parameter of each of the plurality of vehicles and transmits corresponding driving values to a server. The server may then compile the databank from which the quantity distribution can be read or derived, respectively.

The driving value statistic units, for example GPS sensors which are capable of determining, in particular tracking, the current position (and therefore speed, acceleration and/or deceleration), may be provided for reference vehicles or their drivers, respectively, selected from vehicles or drivers registered with the insurance company providing conventional automobile insurance. Alternatively or additionally, such driving value statistic units may be provided for vehicles or their drivers, respectively, who are willing to install these units in the vehicles. Such vehicles or drivers may be found for example through the media, e.g. social media. In this case, it is conceivable that these drivers need to fill in pertinent driver record details, for example accident record, mileage driven per year, and/or the like, in order to filter good candidates for compilation of a driving quality metric/driving value databank. These details may be, at least if an according waiver is provided, verified by their respective automobile insurer.

Preferably, the driving value statistic units are designed as a dongle, e.g. in form of an USB device, which may be connected to a control system, e.g. an engine control unit (ECU), of the vehicle, in order to determine and/or transmit the driving values of the at least one monitored driving parameter. Alternatively, the driving value statistic units are integral with the vehicle, i.e. provided as a built-in unit or a software module, respectively, and configured to determine and/or transmit the driving values of the at least one monitored driving parameter. In particular, the driving value statistics units may be provided by installing such a software module or performing a software update, respectively, such that control systems such as ECUs of the plurality of vehicles are able to determine and/or transmit the driving values of the at least one monitored driving parameter.

In another preferred embodiment, monitoring at least one driving parameter includes monitoring at least the following: (i) vehicle speed; (ii) vehicle acceleration; and (iii) vehicle deceleration. Preferably, these driving parameters may be combined and/or considered for a defined time interval to form other driving parameters, for example erratic driving which is described by the frequency of acceleration and deceleration in a defined time interval and wherein the corresponding driving quantity is indicative of e.g. predictive driving.

In particular, the at least one driving quality may be determined as now described.

During operation of the vehicle the driving speed of the vehicle is determined a plurality of times, e.g. regularly or at random instants of time. The driving speed is thus the monitored driving parameter.

The location of the vehicle is determined for those time points where the speed is or was determined.

Each vehicle speed value is compared with a speed value associated to the respective locations. Such associated speed value can be the statutory speed or prevailing speed at those locations at the time point at which the vehicle drove there.

Then a speed difference between the driving speed value and the associated speed value is determined. This speed difference can be seen as a resulting value.

From a plurality of such resulting values a speed quantity is determined, e.g. by averaging the resulting values or by forming the median of those resulting values. A speed difference is a resulting value, wherein from a plurality of such resulting values determined during a driving period, a driving quality value is determined, e.g. by averaging or other indicative valuation technique. Eventually, from a plurality of such driving quality values, determined e.g. over a month or three months, a driving quantity or driving quality metric is determined.

Alternatively or additionally, the at least one driving quantity is determined as now described.

During operation of the vehicle a positive acceleration of the vehicle, i.e. a speedup acceleration, is detected by an acceleration sensor in the vehicle. The forward acceleration is thus the monitored driving parameter.

If the vehicle acceleration is above a predetermined threshold, a maximum speed is stored as an acceleration event value. The maximum speed can occur during or without deceleration after an acceleration event in which the vehicle acceleration is above a predetermined threshold.

The acceleration event value is compared with a geostationary speed value of the place where the acceleration event value occurred. The geostationary speed value can be the statutory speed or prevailing speed at the location, area or locale where the acceleration event occurred.

This speed difference is a resulting value analog to the speed metric description.

From a plurality of such resulting values an acceleration quantity is determined, e.g. by averaging the resulting values or by forming the median of those resulting values.

Alternatively or additionally, the at least one driving quantity is determined as now described.

During operation of the vehicle a deceleration of the vehicle is detected by an acceleration sensor in the vehicle. In the following, the terms deceleration and negative acceleration are used analogously.

A speed difference between two speeds occurring at the beginning and at the end of an acceleration event, in which the vehicle deceleration is above a predetermined threshold, thus stronger than the threshold, is determined.

From this speed difference a resulting value is determined. The resulting value may be the speed difference as such, or the speed difference divided by a vehicle speed. The vehicle speed can be the speed at the beginning or end of the respective acceleration event, or it is the average speed over the acceleration event. The resulting value is stored as an acceleration event value.

From a plurality of such resulting values a deceleration quantity is determined, e.g. by averaging the resulting values or by forming the median of those resulting values or other indicative measures.

Alternatively or additionally, the at least one driving quantity is determined as now described.

During operation of the vehicle a positive and negative acceleration of the vehicle, each above a predetermined threshold, are detected by an acceleration sensor in the vehicle.

A time span between the positive and negative acceleration is stored as an erratic driving event value, or resulting value, respectively.

From a plurality of such resulting values an erratic driving quantity or erratic driving metric value is determined, e.g. by averaging the resulting values or by forming the median of those resulting values.

A third aspect of the invention relates to a method for improving operation of a vehicle containing an autonomous driving unit configured for autonomously controlling the vehicle and a control takeover management unit configured for passing over control to a human driver. The method comprises the steps: (i) by a detection unit arranged in the vehicle, detecting a change in the driving mode from autonomous driving to manual driving, including at least one of: determining a point in time a control takeover request is outputted by the control takeover management unit, determining a point in time the human driver takes over control from the autonomous driving unit, and determining a point in time the human driver has assumed safe control over the vehicle; (ii) by a sensor unit arranged in the vehicle, monitoring at least one driving parameter during the autonomous driving unit and/or the human driver controlling the vehicle; (iii) by an evaluation unit, based on driving values provided by the sensor unit upon monitoring the at least one driving parameter during a time interval ending at, starting from or including a point in time determined by the detection unit, determining at least one driving quantity quantifying the quality of interplay between the autonomous driving unit and the human driver; and (vi) by a computer, based on the determined at least one driving quantity. At least one of the following is performed:
  i) outputting remedial information used in development of the autonomous driving unit;
  ii) outputting remedial information used in human driver educational purposes; and
  iii) determining whether manual driving associated with a control takeover event has degraded compared to earlier control takeover events, and outputting a warning if a driving safety associated with the determined at least one driving quantity falls below a predetermined threshold.

A fourth aspect of the invention relates to a system for improving operation of a vehicle, the system containing: (i) an autonomous driving unit arranged in a vehicle, the autonomous driving unit being configured for autonomously controlling the vehicle; (ii) a control takeover management unit arranged in the vehicle, the control takeover management unit being configured for passing over vehicle control to a human driver, (iii) a sensor unit arranged in the vehicle, the sensor unit being configured to monitor at least one driving parameter during the autonomous driving unit and/or the human driver controlling the vehicle; (iv) a detection unit arranged in the vehicle, the detection unit being configured to detect a change in the driving mode from autonomous driving to manual driving, including at least one of: determining a point in time a control takeover request is outputted by the takeover unit, determining a point in time the human driver takes over control from the autonomous driving unit, and determining a point in time the human driver assumes safe control over the vehicle; (v) an evaluation unit configured to determine, based on driving values provided by the sensor unit upon monitoring the at least one driving parameter during a time interval ending at, starting from or including a point in time determined by the detection unit, at least one driving quantity quantifying the quality of interplay between the autonomous driving unit and the human driver; (vi) a computer system arranged in a computation facility and containing a risk management model for assessing the effectiveness and/or safety of a control takeover event in a vehicle comprising an autonomous driving unit and a control takeover management unit, the computer system being configured to output assessment data obtained by means of the risk management model and used for operation of the vehicle; and (vi) a configuring unit arranged in the computation facility, the configuring unit being configured to configure the risk management model based on the determined at least one driving quantity.

The described features and advantages described with respect to the first aspect of the invention and its preferred embodiments are, if not explicitly stated otherwise and at least where technically meaningful, valid also for the second, third and fourth aspect of the invention and its preferred embodiments and vice versa.

Further features, advantages and possible applications of the invention will become apparent from the following description in conjunction with the figures, in which the same reference numerals for the same or corresponding elements of the invention are used throughout.

Other features which are considered as characteristic for the invention are set forth in the appended claims.

Although the invention is illustrated and described herein as embodied in a method and system for analyzing the control of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 is an illustration showing an example of a process of transfer of control of a vehicle;

FIG. 2 is a block diagram showing an example of a method for analyzing the control of a vehicle having an autonomous driving unit;

FIG. 3 is a graph showing an example of determining a driving quantity based on driving values obtained during a driving period;

FIG. 4 is an illustration showing an example of determining a driving quantity based on a time interval between an autonomous driving unit outputting a control takeover request and a human driver taking over control.

DETAILED DESCRIPTION OF THE INVENTION

Figure 5:
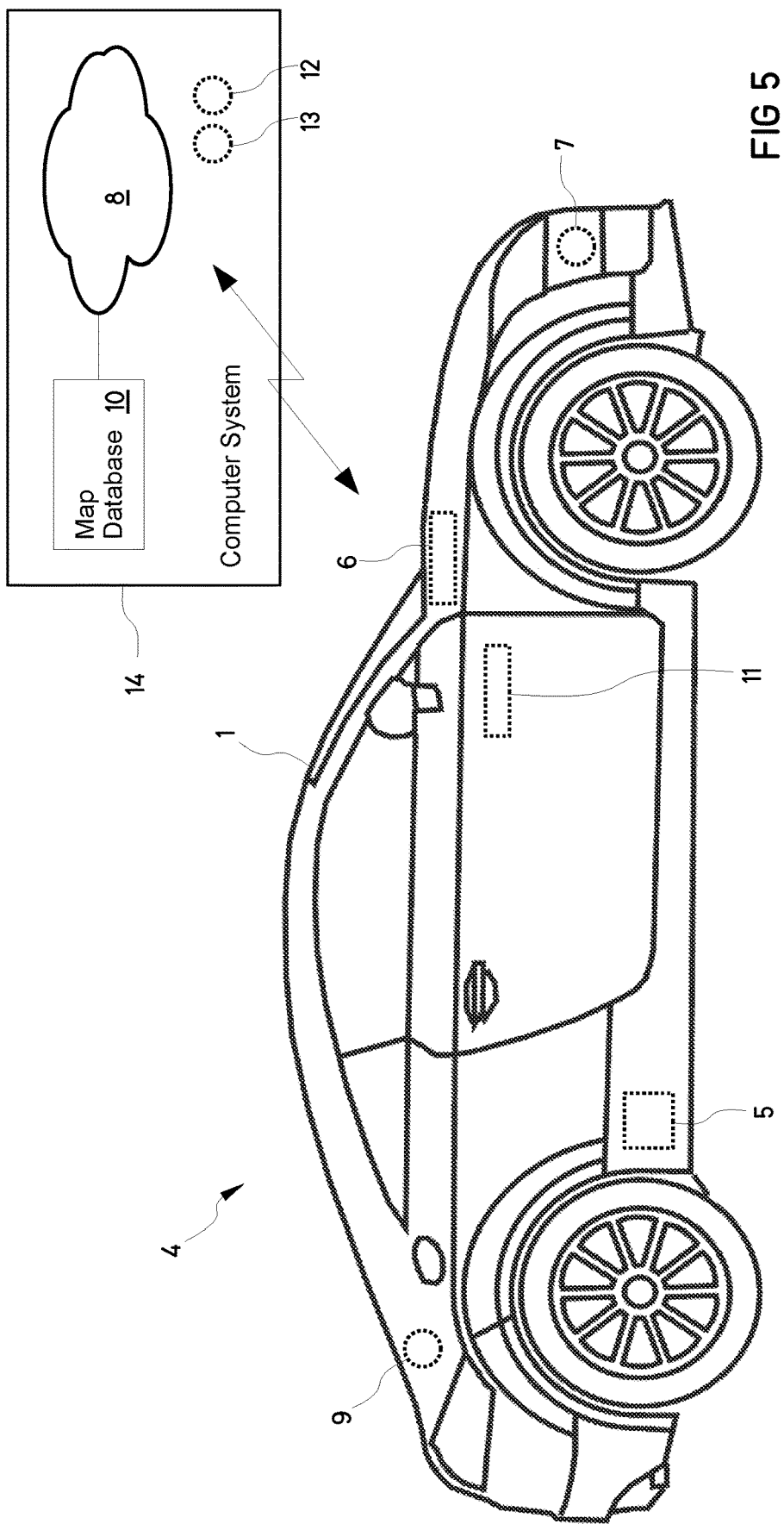
FIG. 5 is an illustration showing an example of a system for analyzing the control of a vehicle comprising an autonomous driving unit.

Referring now to the figures of the drawings in detail and first, particularly to FIG. 1 thereof, there is shown an example of a process of transfer of control of a vehicle 1 from an autonomous driving unit of the vehicle 1 to a human driver, wherein the thick black arrow indicates time t. The transfer of control is grouped into four stages A, B, C, D each representing a different phase of the transfer of control. The different stages A-D are separated by dotted lines.

In the first stage A, the vehicle 1 is under autonomous control. When the autonomous driving unit realizes that an upcoming traffic scenario is too complex to safely control the vehicle in the scenario, the autonomous driving unit outputs a control takeover request R, for example in form of an optical signal, an acoustic signal, a haptic signal and/or the like. From the point in time at which the request is outputted (also referred to as the control takeover request event R) up to the point in time at which the human driver actually takes over control (also referred to as the control takeover event T), the autonomous driving unit still controls the vehicle 1. This period corresponds to the second stage B. During this stage, the control of the vehicle 1 by the autonomous driving unit is key for the situation in which the human driver finds himself in when taking over control at the control takeover event T.

After the human driver has taken over control, the third stage C begins. During this stage, the human driver controlling the vehicle 1 adjusts to the current traffic scenario, for example by executing a particular driving maneuver such as braking (decelerating) or evading (steering). The reactions of the human driver during this stage may be highly dependent on the driving behavior of the autonomous driving unit in the previous stages, in particular in the second stage B. Usually, adjusting to the current traffic scenario, i.e. thoroughly grasping the current situation and performing the necessary maneuvers, takes up to 30 seconds, in particular up to 60 seconds. For this reason, the third stage C preferably extends from the control takeover event T for a predetermined second time interval t2.

In the fourth stage D, starting at the end of the predetermined second time interval t2, the human driver still controls the vehicle 1. Because a significant amount of time since taking over control has passed, no impact of the driving behavior of the autonomous driving unit, in particular driving decisions made by the autonomous driving unit, on the driving of the human driver is to be expected.

In order to evaluate the driving quality of the driving of the autonomous driving unit, in particular in the first and second stage A, B, and/or the driving quality of the human driver, in particular in the third and fourth stage C, D, driving quantities Q1, Q2, Q3, Q4 may be derived from a plurality of driving values obtained by monitoring different driving parameters. For example, vehicle speed, vehicle acceleration, vehicle deceleration and erratic driving may be monitored and taken as the basis to determine the respective driving quantity Q1-Q4, wherein erratic driving is defined as the amount of acceleration and deceleration during a defined time interval. In FIG. 1, the driving quantities Q1-Q4 are indicated by horizontal bars extending through the different stages A-D.

Preferably, to evaluate the quality of interplay between the autonomous driving unit and the human driver, e.g. to rate how well the autonomous driving unit controls the vehicle prior to handing over control to the human driver and/or how well the human driver copes with the traffic scenario the autonomous driving unit maneuvered him into, each of the driving quantities Q1-Q4 may be combined across at least two of the different stages A-D into a composite driving quantity. Alternatively or additionally, a driving quantity for a particular stage A-D may be at least partially based on driving values obtained in a different stage. For example, determining an autonomous driving quantity Q1-Q4 quantifying the quality of driving of the autonomous driving unit during the second stage B may be determined by considering not only driving values obtained by monitoring a driving parameter during the second stage B, but also driving values obtained by monitoring the same driving parameter during at least part of the preceding first stage A, this part being indicated by reference numeral A'. In particular, the autonomous driving quantity Q1-Q4 may be determined based on driving values obtained during a predetermined first-time interval t1 extending from the control takeover request event R back into the first stage A, i.e. covering driving values obtained prior to outputting the control takeover request R.

FIG. 2 shows an example of a method 2 for improving operation of a vehicle having the autonomous driving unit and a control takeover management unit. In step S1, a change in driving mode from autonomous driving to manual driving is detected. For example, a point in time may be determined at which the autonomous driving unit outputs a control takeover request signal, and a point in time may be determined at which a human driver takes over control.

In a further step S2, at least one driving parameter as speed, acceleration, deceleration and/or the like is monitored. This monitoring may occur before and/or after the change in driving mode detected in step S1, i.e. during autonomous driving and/or manual driving.

The driving values obtained by the monitoring are preferably grouped into different stages of the change in control (see FIG. 1). Additionally or alternatively, the driving values are stored at least for a predetermined storage time interval.

Based on the obtained driving values, at least one driving quantity quantifying the quality of interplay between the autonomous driving unit and the human driver is determined in a further step S3. Therein, the driving quantity is determined with respect to the detected change in driving mode, e.g. by separately evaluating driving values obtained during at least two of the different stages of the change in control and comparing the evaluation results, or by differently weighting driving values from different stages.

In a further step S4, a risk management model is modified based on the determined driving quantity. This risk management model may be hosted by a computer system and designed for assessing the effectiveness and/or safety of control takeover events in a vehicle comprising an autonomous driving unit and a control takeover management unit. For example, the risk management model may be initialized based on the determined driving quantity, i.e. parameter values may be determined based on the determined driving quantity. Alternatively or additionally, the risk management model may be updated based on the determined driving quantity, i.e. the structure and/or mathematical functions of the model may be altered based on the determined driving quantity.

In a further step S5, assessment data may be outputted by the risk management model. To this end, the model may be executed on or by the computer system. The assessment data may be indicative of the security and/or safety of the control takeover event(s) associated with the autonomous driving unit and the human driver. For example, the assessment data may comprise a rating value allowing a comparison to other combinations of autonomous driving units and human drivers. Alternatively, the executing the risk management model includes this comparison, and the assessment data is indicative of an insurance premium. Accordingly, the assessment data is used for operation of the vehicle in further step S6.

In another variant of the method 2, in step S4 a remedial information used in development of the autonomous driving unit and/or used in human driver educational purposes is determined and outputted in step S5. Alternatively or additionally, in step S6 it is determined whether manual driving associated with a control takeover event has degraded compared to earlier control takeover events, and a warning is outputted if a driving safety associated with the determined at least one driving quantity falls below a predetermined threshold.

FIG. 3 shows an example of determining a driving quantity based on driving values obtained during a driving period. In particular, FIG. 3A schematically indicates how an autonomous driving quantity quantifying the quality of driving of the autonomous driving unit is determined, while FIG. 3B schematically indicates how a manual driving quantity quantifying the quality of driving of a human driver is determined. To eventually rate the overall combined driving of the entity comprising both the autonomous driving unit and the human driver, the autonomous and the manual driving quantity may be combined into a composite driving quantity.

Both the autonomous and manual driving quantities are based on driving values which are obtained by monitoring a driving parameter, for example speed, during autonomous or manual operation of the vehicle, respectively. These driving values are preferably collected during a driving period, wherein a driving period may correspond to a single journey or a plurality of journeys of the vehicle, in particular during a predetermined time span as ten days, a month or quarter of the year. The driving values may be obtained with respect to the current location of the vehicle and compared to a driving value associated with the location, e.g. a statutory speed limit, an average speed or the like. The result of the comparison, e.g. a difference, may give a driving quality value.

Thus, each monitoring of the driving parameter during a part of the driving period, e.g. during separate journey "events", in particular with regard to different stages of the change in driving mode of the vehicle between autonomous control of the autonomous driving unit and the human driver, results in a particular quality value distribution Vi of driving quality values, the index i=1 . . . n indicating the ith part of the driving period or the ith event or stage, respectively.

From each of these quality value distributions Vi, a normal distribution N may be obtained, in particular by averaging each of the quality value distributions Vi. This reflects the central limit theorem according to which a large number of independent random variables (the driving values) asymptotically forms a stable distribution, in particular the normal distribution.

From the normal distribution N, the autonomous (FIG. 3A) or manual (FIG. 3B) driving quantity may be determined, respectively. In particular, the driving quantity may be determined based on a property of the normal distribution N. For example, the driving quantity may be associated with the expected value of the normal distribution N. Additionally or alternatively, it is also conceivable that the driving quantity is associated with or determined based on another property, as e.g. the variance or the full width at half maximum (FWHM), or possibly a combination thereof.

In particular, the driving quantity may be determined based on a comparison of a property of the normal distribution N with the same property of an averaged distribution, the averaged distribution being preferably based on a plurality of normal distributions obtained from a plurality of driving periods of different vehicles driven by an autonomous driving unit or different human driver, respectively. For example, if the expected value of the average distribution with regard to vehicle speed during autonomous driving amounts to a first speed and the expected value of the determined normal distribution N with regard to vehicle speed during autonomous driving amounts to a second speed, the driving quantity may be determined as the difference between the first and the second speed.

FIG. 4 shows an example of determining a driving quantity based on the time interval $\Delta t$ between an autonomous driving unit outputting a control takeover request R (also referred to as control takeover request event R) and human driver 3 taking over control of a vehicle 1 (also referred to as control takeover event T). By basing the driving quantity on the time interval $\Delta t$, it is possible to quantify the driver's degree of attentiveness as well as the effectiveness of the design of the critical man-machine aspects of the autonomous driving unit particularly with respect to alerting the driver 3 for imminent transfer of control.

The time interval $\Delta t$ may be determined as the time lag between the control takeover request event R and the detection of a control signal generated by an interaction of the human driver 3 with the vehicle 1, in particular the control system of the vehicle 1. For example, the time interval $\Delta t$ may be the time lag between the control takeover request event R and a contact being detected between the driver's hands and the steering wheel, a pressure exerted on a pedal being detected, a change in posture of the driver being detected, and/or the like. Accordingly, the driving quantity may be a time lag metric.

Preferably, the driving quantity is determined based further on a vehicle speed the vehicle 1 exhibits during the time interval $\Delta t$. In particular, the time interval $\Delta t$ may be weighted by the vehicle speed. This results in a distance d the vehicle 1 covers between the control takeover request event R and the control takeover event T. Because the vehicle speed may change during the time interval $\Delta t$, it is preferred to base the driving quantity on an average speed.

Further preferably, the change in driving mode may be grouped for a particular locale as e.g. urban, rural or highway. This may help to obtain a more differentiated assessment of the intertwined impact of both handover alert design and driver alertness, because the speed of the vehicle 1 during control handovers in urban areas is significantly lower than during control handovers on a highway.

From a plurality of such changes in driving mode, occurring for example during a driving period of a plurality of journeys of the vehicle 1 e.g. over ten days, a month or a quarter of a year and/or with respect to a particular locale category, a distribution of the weighted time interval, i.e. the distance d, may be obtained (see FIG. 3). The driving quantity is preferably associated with a property of this distribution, for example its expected value. In particular, the driving quantity may be associated with an average of a particular part of the distribution, e.g. the fourth quartile. In that way, only the 25% worst cases are taken into account, the rationale being here that not too many changes of control are to be expected and thus the focus should be on the most meaningful cases in terms of causation of AI assisted driving accidents.

This driving quantity may be rated, e.g. by comparing it to a corresponding property of an average distribution of the weighted time interval obtained for e.g. a plurality of other vehicles or from records of the same vehicle and/or driver. Alternatively, the driving quantity may be determined by the comparison, e.g. as the difference between the property of the distribution of the present vehicle 1 and the corresponding property of the average distribution obtained from the plurality of other vehicles or records, respectively. If the driving quantity, e.g. said difference, exceeds a certain threshold, the driver 3 may be informed of a takeover attention deficit and/or autonomous navigation, at least for a certain locale category as urban or rural, may be suspended. Alternatively or additionally, the autonomous driving unit or the corresponding autonomous driving solution provider, respectively, may be assigned an increased premium from its insurer to reflect the ineffectiveness of its transfer of control solution relative to that of other autonomous driving solution providers.

FIG. 4 shows an example of a system 4 for improving operation of a vehicle 1 having an autonomous driving unit 5 and a control takeover management unit 11. The system 4 comprises a detection unit 6 configured to detect a change in the driving mode from autonomous driving by the autonomous driving unit 5 to manual driving by a human driver and a sensor unit 7 configured to monitor at least one driving parameter before and/or after the change was detected. Further, the system 4 comprises an evaluation unit 8 configured to determine, based on driving values provided by the sensor unit 7 upon monitoring with respect to the detected change driving mode, at least one driving quantity quantifying the quality of interplay between the autonomous driving unit 5 and the human driver. The evaluation unit 8 may further include position data indicative of the vehicle's position provided by e.g. a GPS sensor 9 in the determination of the at least one driving quantity, e.g. to compare a current driving value to a distribution of driving values obtained for other vehicles at the same position or to a statutory speed limit. In the present example, the evaluation unit 8 has access to a map database 10 containing map data, which provides e.g. information on such statutory speed limits with respect to location.

Additionally, the map data may provide information on GPS signal quality. The GPS signal quality may be considered by the evaluation unit 9 with regard to the determination of the at least one driving quality. If e.g. the GPS signal is indicated as weak and thus considered unreliable, accelerometer of an accelerometer of the vehicle 1 or a mobile device carried along in the vehicle 1 may be used instead to determine the position of the vehicle 1.

In the shown example, the evaluation unit 8 is configured as a central evaluation unit 8, e.g. a software module running on a processing unit communicatively coupled to the vehicle 1 by means of a wireless connection, for example via the Internet. However, in another embodiment (not shown), the evaluation unit 8 may be arranged in or be part of the vehicle 1, respectively.

The evaluation unit 8 may be part of a computation facility or data processing center. Particularly, the evaluation unit 8 may be established or hosted by a computer system 14 of the computation facility or data processing center. The computer system 14 preferably also has a risk management model 12 configured for assessing the effectiveness and/or safety of a control takeover event in a vehicle having an autonomous driving unit and a control takeover management unit and is configured to output to output assessment data obtained by means of the risk management model and used for operation of the vehicle. The risk management model 12 is preferably configurable by means of a configuration unit 13, which might also be a part of the computer system 14.

The evaluation unit 8 may evaluate the driving values provided by the sensor unit 7 during driving periods, e.g. a single journey or a plurality of journeys, with respect to the driving mode, in particular one of different stages A, A', B, C, D of the change in driving mode (see FIG. 1). From the driving values, the evaluation unit 8 may determine a normal distribution, at least one property of which may be used to derive the driving quantity (see FIG. 2). In particular, the evaluation unit 8 may evaluate data in form of driving values obtained from a plurality of different vehicles as well or have at least access to a databank containing these data, and determine the driving quantity based on a comparison of at least one property of the normal distribution obtained for the present vehicle 1 and corresponding distributions obtained for the plurality of other vehicles using normal or non-parametric methods of inference.

In particular, the evaluation unit 8 may be configured to determine, based on the driving values provided by the sensor unit 7, an autonomous driving quantity quantifying the driving of the autonomous driving unit 5 during a first stage A and/or a second stage B of the transfer in control and a manual driving quantity quantifying the driving of the human driver during a third stage C and/or a fourth stage D of the transfer in control (see FIG. 1). The autonomous and manual driving quantity may then be combined into the driving quantity quantifying the quality of the interplay between the autonomous driving unit 5 and the human driver, i.e. the quality of driving of the entity comprising both the autonomous driving unit 5 and the human driver.

For example, the evaluation unit 8 may be configured to determine a combined driving quantity $Q_{C+D}=Q'_M$ for manual driving during stages three (C) and four (D) of the change in driving mode as follows:
When $$Q_D > Q_C \text{ then } Q'_M = Q_D + \%_{AccC} \cdot \left[Q_D + \frac{S_D^2}{S_C^2}\right] \cdot (Q_C - Q_D),$$

and when $$Q_D < Q_C \text{ then } Q'_M = Q_D + \%_{AccC} \cdot \left[Q_D + \frac{S_C^2}{S_D^2}\right] \cdot (Q_C - Q_D).$$

Therein, $Q_D$ and $Q_C$ are the driving quantities quantifying the quality of driving during the fourth and third stage D and C, respectively, and $\%_{Acc\ C}$ is the accident rate value for, e.g. nominal percentage of accidents occurring during, the third stage C. Further, $S_D^2$ and $S_C^2$ are the variances of the normal distributions determined from the driving values for driving during the fourth and third stage D and C, respectively (see FIG. 3).

Similarly, the evaluation unit 8 may be configured to determine a combined driving quantity $Q_{A+B}=Q'_A$ for autonomous driving during stages one (A) and two (B) of the change in driving mode as follows:

When $$Q_A > Q_B \text{ then } Q'_A = Q_A + \%_{AccB} \cdot \left[Q_A + \frac{S_A^2}{S_B^2}\right] \cdot (Q_B - Q_A),$$

and when $$Q_A < Q_B \text{ then } Q'_A = Q_A + \%_{AccB} \cdot \left[Q_A + \frac{S_A^2}{S_B^2}\right] \cdot (Q_B - Q_A).$$

Therein, $Q_A$ and $Q_B$ are the driving quantities quantifying the quality of driving during the first and second stage A and B, respectively, and $\%_{Acc\,B}$ is the accident rate value for, e.g. the nominal percentage of accidents occurring during, the second stage B. Further, SA and SB are the variances of the normal distributions determined from the driving values for driving during the first and second stage A and B, respectively.

From the combined driving quantities for autonomous driving $Q_{A+B}=Q'_A$ and manual driving $Q_{C+D}=Q'_M$, the composite driving quantity $Q_{A+B+C+D}$ quantifying the quality of interplay between the autonomous driving unit 5 and the human driver may then be obtained as follows:

When $Q'_M > Q'_A$ then $Q_{A+B+C+D} =$ $$Q'_M \cdot \%_M + \%_A \cdot \left[Q'_M + \frac{S_D^2}{S_A^2}\right] \cdot (Q'_A - Q'_M),$$

and when $Q'_M < Q'_A$ then $Q_{A+B+C+D} =$ $$Q'_M \cdot \%_M + \%_A \cdot \left[Q'_M + \frac{S_A^2}{S_D^2}\right] \cdot (Q'_A - Q'_M).$$

Therein, $\%_M$ and $\%_A$ are the relative mileages accrued under manual and autonomous control, respectively.

Alternatively or additionally, the sensor data of the GPS sensor 9 and/or the GPS signal quality provided by the map database 10 may be used to determine the at least one driving quantity as follows: if the GPS signal is weak or indicated as weak, e.g. due to the vehicle passing through a tunnel, the driving values may be obtained by an extrapolation of previously obtained driving values. In particular, the speed of the vehicle 1 may be determined based on the locations of strong or at least reliable GPS signal, e.g. ahead and behind the tunnel, and the time needed by the vehicle 1 to travel between these locations. If speeding is detected this way, this may have a direct effect on the determined driving quantity.

Alternatively or additionally, the evaluation unit 8 may be configured to interrelate the driving quantity, in particular for the different stages A-D of the change in driving mode, to a quantity distribution of the same driving quantity obtained from a plurality of other vehicles with an autonomous driving unit and different human drivers or from records of the present vehicle 1. By this means, it becomes possible for the evaluation unit 8 to assess the responsibility of either the autonomous driving unit 5 or the human driver in the case of an accident during one of the stages A-D of the change in driving mode. In other words, the determined driving quantity may be used as a forensic tool in case of accidents occurring during the change in driving mode, in particular during the second or third stage B, C.

For example, if a driving quantity quantifying the quality of driving of the autonomous driving unit 5 during a part A' of the first stage A, e.g. a first time interval prior to a control takeover request event, is substantially equal to the average of the same driving quantity obtained for the plurality of other vehicles during the first stage A, this may indicate responsibility of the human driver. That is because substantially equal quantities indicate no deterioration of the autonomous driving and thus a regularly operating autonomous driving unit 5.

If, however, the driving quantity is higher than the average driving quantity obtained for the plurality of other vehicles during the first stage A, this may indicate deterioration of the autonomous driving, and thus suggest responsibility of the autonomous driving unit. That is, the relative increase of the driving quantity, e.g. due to higher speed, stronger and/or more erratic acceleration and/or deceleration, can be associated with the (unsuccessful) attempt of the autonomous driving unit 5 to cope with the upcoming complex traffic scenario.

Examples for the different driving quantities which may be determined for the different stages A-D of the change in driving mode are given in the table below as follows:

| Period | Driving quantity notation |
|---|---|
| during first stage A | $Q_A$ (quantifying the quality of unimpaired autonomous driving) |
| during a predetermined first time interval prior to the second stage B (stage A') | $Q_{pre-B}$ (quantifying the quality of autonomous driving in view of an upcoming complex traffic scenario) |
| during second stage B | $Q_B$ (quantifying the quality of autonomous driving in view of immanent handover) |
|  | $Q_{\Delta t}$ (quantifying the quality of handover alert design and driver alertness, see FIG. 3) |
| during third stage C | $Q_C$ (quantifying the quality of manual driving in view of a complex traffic scenario) |
| during fourth stage D | $Q_D$ (quantifying the quality of unimpaired manual driving) |

Further, the different driving quantities with exemplary interrelationships or relationships to their average, respectively, as well as the possible inferred responsibility is given in the table below as follows:

| Driving quantity | Responsible |
|---|---|
| $Q_{\Delta t} > Q_{\Delta t,\,average}$ | human driver |
| $Q_B \approx Q_A$ |  |
| $Q_{pre-B} \approx Q_A$ |  |
| $Q_C > Q_D$ |  |
| $Q_{\Delta t} \approx Q_{\Delta t,\,average}$ | autonomous driving unit |
| $Q_B > Q_A$ |  |
| $Q_{pre-B} > Q_A$ |  |
| $Q_C \approx Q_D$ |  |

This responsibility may be assigned as described in the above table particularly if an accident occurs after the autonomous driving unit has attempted to re-engage the driver, i.e. if the autonomous driving unit has outputted a control takeover request. If, on the other hand, the accident occurs during autonomous driving with no attempt to re-engage the driver, the responsibility may be assigned to the autonomous driving unit or its manufacturer, respectively.

The following is a summary list of reference numerals and the corresponding structure used in the above description of the invention:

1 vehicle
2 method
3 driver
4 system
5 autonomous driving unit
6 detection unit
7 sensor unit
8 evaluation unit
9 GPS sensor
10 map database
11 control takeover management unit
12 risk management model
13 configuring unit
14 computer system
A-D stages of the change in driving mode
A' part of the first stage
N normal distribution
R control takeover request event
T control takeover event
Vi quality value distribution
d distance
t time
t1, t2 first, second time interval
Δt time interval

The invention claimed is:

1. A method for improving an operation of a vehicle having an autonomous driving unit configured for autonomously controlling the vehicle and a control takeover management unit configured for passing over control to a human driver, which comprises the steps of:
- detecting, via a detector disposed in the vehicle, a change in a driving mode from autonomous driving to manual driving, the detecting including at least one of: determining a point in time a control takeover request is outputted by the control takeover management unit, determining a point in time the human driver takes over control from the autonomous driving unit, and determining a point in time when the human driver assumes safe control over the vehicle;
- monitoring, via a sensor disposed in the vehicle, at least one driving parameter during the autonomous driving unit and/or the human driver controlling the vehicle;
- determining at least one driving quantity describing the combined driving quality of a vehicle temporarily controlled by the autonomous driving unit and temporarily controlled by the human driver, via an evaluation unit, based on obtained driving values provided by the sensor upon monitoring the at least one driving parameter during a time interval ending at, starting from or including a point in time determined by the detector, wherein a driving behavior of the autonomous driving unit and/or the human driver as characterized by the obtained driving values is compared to a driving behavior of the driving units and/or human drivers of reference vehicles as characterized by a quantity distribution of driving values provided by a plurality of reference vehicles, and a difference between the driving behavior of the autonomous driving unit and/or the human driver and the driving behavior of the driving units and/or human drivers of reference vehicles corresponds to the at least one driving quantity;
- configuring, via a configuring unit disposed in a computation facility and based on the at least one determined driving quantity, a risk management model for assessing an effectiveness and/or safety of control takeover events in the vehicle having the autonomous driving unit and the control takeover management unit;
- outputting, via a computer system disposed in the computation facility and having the risk management model, assessment data obtained by executing a configured risk management model; and
- operating the vehicle based on the assessment data.

2. The method according to claim 1, which further comprises determining the at least one driving quantity based on an information regarding a software change and/or hardware change in the control takeover management unit.

3. The method according to claim 1, which further comprises monitoring the at least one driving parameter by determining a time interval between the autonomous driving unit outputting the control takeover request and the human driver taking over control.

4. The method according to claim 1, which further comprises determining the at least one driving quantity based on a time interval between the autonomous driving unit outputting the control takeover request and the human driver taking over control, and on a vehicle dynamic variable during the time interval.

5. The method according to claim 4, which further comprises determining the at least one driving quantity based on a product of the time interval and the vehicle dynamic variable during the time interval, wherein the product reaches or exceeds a threshold.

6. The method according to claim 1, which further comprises storing the driving values obtained during the monitoring for a predetermined storage time interval spanning at least from a point in time before the control takeover request is outputted by the autonomous driving unit to the point in time the autonomous driving unit outputs the control takeover request.

7. The method according to claim 1, wherein the at least one driving quantity is a composite quantity.

8. The method according to claim 1, which further comprises determining the at least one driving quantity based on an autonomous driving quantity quantifying a quality of driving of the autonomous driving unit before the change in the driving mode and on a manual driving quantity quantifying a quality of a driving of the human driver after the change in the driving mode.

9. The method according to claim 8, wherein the at least one driving quantity is further based on mileage accumulated in a respective driving mode.

10. The method according to claim 1, which further comprises determining the at least one driving quantity based on an autonomous driving quantity quantifying a quality of the driving of the autonomous driving unit after the control takeover request is outputted by the autonomous driving unit and on a manual driving quantity quantifying a quality of a driving of the human driver subsequently to him taking over control.

11. The method according to claim 1, wherein the at least one driving quantity is further based on accident rate values for autonomous driving or manual driving after the takeover control request is outputted by the autonomous driving unit and subsequently to the human driver taking over control, respectively.

12. The method according to claim 1, which further comprises determining the at least one driving quantity based on driving values obtained by the monitoring during a predetermined first-time interval prior to the autonomous driving unit outputting the control takeover request.

13. The method according to claim 1, wherein the at least one determined driving quantity is interrelated to a quantity distribution of a same driving quantity.

14. The method according to claim 1, which further comprises determining the at least one driving quantity based on a quantity distribution, the quantity distribution being determined based on driving value data provided by a plurality of vehicles.

15. The method according to claim 1, wherein the driving value data is generated by driving value statistic units provided in each of a plurality of vehicles, the driving value statistic units monitoring at least one driving parameter of each of the plurality of vehicles and transmitting corresponding driving values to a server.

16. A system for improving operation of a vehicle, the system comprising:
- an autonomous driving unit disposed in the vehicle, said autonomous driving unit configured for autonomously controlling the vehicle;
- a control takeover management unit disposed in the vehicle, said control takeover management unit being configured for passing over vehicle control to a human driver,
- a sensor disposed in the vehicle, said sensor configured to monitor at least one driving parameter during said autonomous driving unit and/or the human driver controlling the vehicle;
- a detector disposed in the vehicle, said detector configured to detect a change in a driving mode from an autonomous driving to manual driving, said detector performing at least one of the following: determining a point in time a control takeover request is outputted by said control takeover management unit, determining a point in time the human driver takes over control from said autonomous driving unit, and determining a point in time the human driver assumes safe control of the vehicle;
- an evaluator configured to determine at least one driving quantity describing the combined driving quality of a vehicle temporarily controlled by the autonomous driving unit and temporarily controlled by the human driver, based on obtained driving values provided by said sensor upon monitoring the at least one driving parameter during a time interval ending at, starting from or including a point in time determined by said detector, wherein a driving behavior of the autonomous driving unit and/or the human driver as characterized by the obtained driving values is compared to a driving behavior of the driving units and/or human drivers of reference vehicles as characterized by a quantity distribution of driving values provided by a plurality of reference vehicles, and a difference between the driving behavior of the autonomous driving unit and/or the human driver and the driving behavior of the driving units and/or human drivers of reference vehicles corresponds to the at least one driving quantity;
- a computer system disposed in a computation facility and having a risk management model configured to assess an effectiveness and/or safety of control takeover events in the vehicle having said autonomous driving unit and said control takeover management unit, said computer system configured to output assessment data obtained by means of said risk management model and used for operating the vehicle; and
- a configuring unit disposed in the computation facility, said configuring unit configured to configure the risk management model based on the at least one driving quantity.

* * * * *